(12) United States Patent
Homan et al.

(10) Patent No.: US 12,025,765 B2
(45) Date of Patent: Jul. 2, 2024

(54) METHOD FOR SATURATION EVALUATION OF GRAPHITIC KEROGEN BEARING FORMATIONS

(71) Applicant: Schlumberger Technology Corporation, Sugar Land, TX (US)

(72) Inventors: Dean Homan, Damon, TX (US); Natalie Uschner-Arroyo, Denver, CO (US); Chang-Yu Hou, Cambridge, MA (US); Denise Freed, Newton Highlands, MA (US); John Rasmus, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 224 days.

(21) Appl. No.: 17/771,514

(22) PCT Filed: Oct. 27, 2020

(86) PCT No.: PCT/US2020/057516
§ 371 (c)(1),
(2) Date: Apr. 25, 2022

(87) PCT Pub. No.: WO2021/086845
PCT Pub. Date: May 6, 2021

(65) Prior Publication Data
US 2022/0381939 A1 Dec. 1, 2022

Related U.S. Application Data

(60) Provisional application No. 62/926,908, filed on Oct. 28, 2019.

(51) Int. Cl.
*G01V 3/00* (2006.01)
*E21B 49/00* (2006.01)
(Continued)

(52) U.S. Cl.
CPC .............. *G01V 3/32* (2013.01); *E21B 49/00* (2013.01); *G01V 3/26* (2013.01); *G01V 3/38* (2013.01); *E21B 2200/20* (2020.05)

(58) Field of Classification Search
CPC .............. G01V 3/32; G01V 3/26; G01V 3/38
(Continued)

(56) References Cited

U.S. PATENT DOCUMENTS

2013/0047717 A1 2/2013 Gzara
2016/0047935 A1 2/2016 Ali et al.
(Continued)

FOREIGN PATENT DOCUMENTS

WO 2016007400 A1 1/2016
WO WO-2017083059 A1 * 5/2017 ............... G01V 3/32

OTHER PUBLICATIONS

International Preliminary Report on Patentability issued in International Patent application PCT/US2020/057516 on May 12, 2022, 8 pages.
(Continued)

*Primary Examiner* — Walter L Lindsay, Jr.
*Assistant Examiner* — Frederick Wenderoth
(74) *Attorney, Agent, or Firm* — Jeffrey D. Frantz

(57) ABSTRACT

A method for evaluating saturation of a kerogen bearing subterranean formation includes obtaining conductivity and permittivity values of the formation and providing an effective medium model relating the conductivity and the permittivity to a water filled porosity of the formation and an effective aspect ratio of graphitic kerogen particulate in the formation. The obtained conductivity and the permittivity values are input into the model which is in turn processed to compute the water filled porosity. The method may further optionally include evaluating the water filled porosity to estimate a hydrocarbon producibility of the formation.

20 Claims, 11 Drawing Sheets

(51) Int. Cl.
  *G01V 3/26* (2006.01)
  *G01V 3/32* (2006.01)
  *G01V 3/38* (2006.01)
(58) Field of Classification Search
  USPC ..................................................... 324/303
  See application file for complete search history.

(56) References Cited

U.S. PATENT DOCUMENTS

2016/0097876 A1  4/2016  Freed et al.
2018/0321416 A1  11/2018  Freedman

OTHER PUBLICATIONS

International Search Report and Written Opinion issued in International Patent application PCT/US2020/057516 on Feb. 24, 2021, 12 pages.
Haslund, E. et al., "Determination of porosity and formation factor of water-saturated porous specimens from dielectric dispersion measurements", Geophysics, 1998, 63(1), pp. 149-153.
Kenyon, W. E., Texture effects on megahertz dielectric properties of calcite rock samples, Journal of Applied Physics, 55, 1984, 3153-3159.
Klein, et al., "An Improved Model for the Dielectric Constant of Sea Water at Microwave Frequencies", IEEE Transactions on Antennas and Propagation, 1977, 25(1), pp. 104-111.
Landau et al., 1984, Electrodynamics of Continuous Media, Second Edition (Course of Theoretical Physics): vol. 8, Butterworth-Heinemann, pp. 149-151.
Misra, S. et al., "Interfacial polarization of disseminated conductive minerals in absence of redox-active species—Part 1: Mechanistic model and validation", Geophysics, 2016, 81(2), E139-E157.
Qian, J. et al., "Dielectric Enhancement from Non-Insulating Particles with Ideally Polarized Interfaces and Zero $\zeta$-Potential I: Exact Solution", arXiv:1605.05029, 2016.
Qian, J. et al., "Universal Dielectric Enhancement from Externally Induced Double Layer Without $\zeta$-potential", arXiv: 1510.06724, 2015, 32 pages.
Rasmus, J. C. et al., "Observations of Induction Dielectric Measurements and Their Role in Determining Thermal Maturity of Organic Mudrocks", conference proceedings, URTEC-2901940-MS, 2018, presented at the Unconventional Resources Technology Conference, Houston, Texas, U.S.A, 22 pages.
Revil, A. et al., "Induced polarization response of porous media with metallic particles—Part 6: The case of metals and semimetals", Geophysics, 2017, 82(2), pp. E97-E110.
Stroud, D. et al., "Analytical model for the dielectric response of brine-saturated rocks", Physical Review B, 1986 34(8), pp. 5145-5153.
Mnegar, H. J. et al., Induced polarization of shaly sands, Geophysics, 1984, 49(8), pp. 1267-1287.
Wang, G. L. et al., Determining Resistivity and Low-Frequency Dielectric Constant Using Induction Data in the Presence of Strong Induced Polarization, Transactions, SPWLA 60th Annual Logging Symposium, SPWLA-2019-PP, 2019, pp. 1-17.
Wang, H. et al., "The Broadband Electromagnetic Dispersion Logging Data in a Gas Shale Formation: A Case Study", presented at the SPWLA 54th Annual Logging Symposium in New Orleans, Louisiana, USA, Society of Petrophysicists and Well-Log Analysts, 2013, 12 pages.
Wong, J., "An electrochemical model of the induced-polarization phenomenon in disseminated sulfide ores", Geophysics, 1979, 44(7), pp. 1245-1265.
Abramowitz et al., Handbook of Mathematical Functions, Dover Publications, Inc., Mineola, New York, 1972, pp. 332.

* cited by examiner

METHOD FOR SATURATION EVALUATION OF GRAPHITIC KEROGEN BEARING FORMATIONS

CROSS REFERENCE TO RELATED APPLICATIONS

This application is a National Stage Entry of International Patent Application No. PCT/US2020/057516, filed on Oct. 27, 2020, which claims the benefit of U.S. Provisional Application Ser. No. 62/926,908 entitled Method for Saturation Evaluation of Highly Mature Kerogen Bearing Formations, filed Oct. 28, 2019, the entirety of which is incorporated herein by reference.

BACKGROUND

Evaluation of formation fluid saturation based on electromagnetic (EM) response (e.g., electromagnetic logging measurements) is the most common practice for oil-reserve quantification. The resistivity (reciprocal of conductivity) of the formation is commonly measured and then interpreted together with a saturation equation to obtain the formation water saturation. To the zeroth order, the formation EM responses can be directly related to the amount of brine saturated in the formation, which allows the establishment of correlations between water saturation and conductivity signal, such as Archie's equation.

The presence of specific minerals, however, has been shown to alter the formation EM response from Archie's type e.g., in the lower radio frequency range. One notable example includes shaly sand formations where clay minerals contribute to both the conductivity and permittivity signals. Various saturation equations have been proposed for evaluating the formation water saturation of clay-bearing formations.

Another notable example includes mature kerogen bearing formations (mature kerogen formations are commonly understood to be formations including graphitic kerogen). It has been observed that as kerogen maturity increases the resistivity initially increases due to the increase of oil saturation and then reverses to very low resistivity values. Such low resistivity cannot be explained by either Archie's equation or models including clay effects. As a result, conventional analysis is unable to accurately determine the hydrocarbon bearing potential of mature kerogen containing formations.

SUMMARY

A method is disclosed for evaluating saturation of graphitic kerogen bearing formations. The method includes obtaining conductivity and permittivity values of the formation. An effective medium model is provided relating the conductivity and the permittivity to a water filled porosity of the formation and an effective aspect ratio of graphitic kerogen particulate in the formation. The conductivity and the permittivity values (the complex dielectric constant) are input into the effective medium model which is then processed to compute the water filled porosity of the formation. The processing may further include computing the effective aspect ratio of graphitic kerogen particulate.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
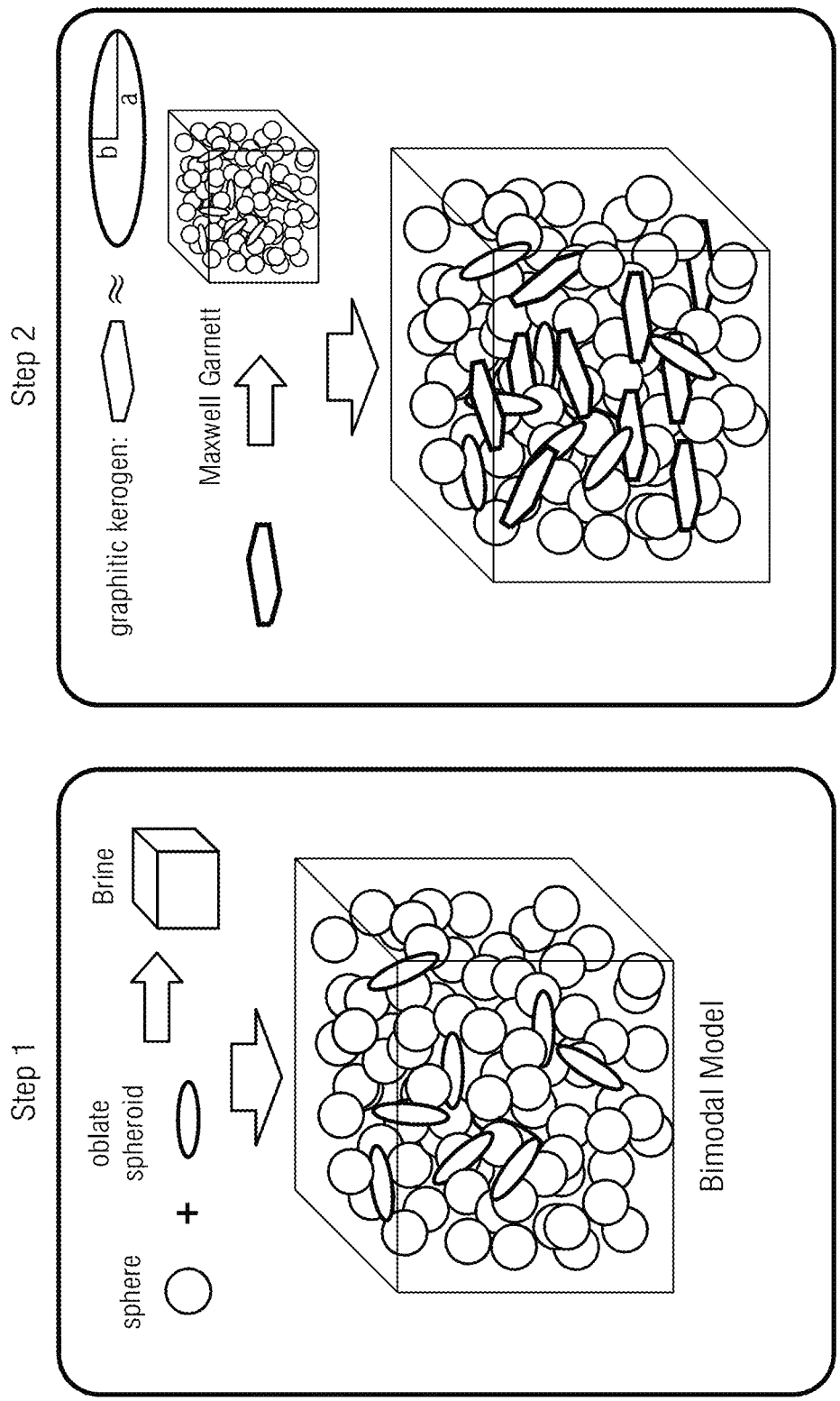
FIG. 1 depicts example schematic representations of subterranean formations used to generate the disclosed effective medium model.

The disclosed embodiments relate generally to methods for evaluating the hydrocarbon bearing potential of subterranean formations and more particularly to methods for saturation evaluation of graphitic kerogen bearing formations. Conductivity and dielectric permittivity values (e.g., obtained from electromagnetic logging measurements) are input into an effective medium model which is in turn processed (e.g., via inversion processing) to compute the water filled porosity of the formation. The model relates conductivity and permittivity of the formation to a water filled porosity of the formation and an effective aspect ratio of graphitic kerogen particulate in the formation and is based (in part) on the polarization response of graphitic kerogen particulate (grains) dispersed in the formation. The model may be further used to compute the effective aspect ratio of the graphitic kerogen particulate.

The disclosed method(s) may advantageously provide for improved petrophysical evaluation of kerogen bearing formations. In particular, the disclosed embodiments may enable a more accurate determination of the water filled porosity of graphitic kerogen bearing formations which in turn may provide for a more accurate evaluation of the hydrocarbon bearing potential of such formations. The electromagnetic response of a formation, either the resistivity, permittivity or both, is the most widely obtained logging signal(s) in oil-field operations for obtaining a water saturation evaluation. Obtaining an accurate saturation interpretation based on EM signals is therefore of importance for reserve quantification (e.g., determining hydrocarbon producibility). As described above, this evaluation has been difficult (or even impossible) for certain formation mineral compositions. As observed in practice, the presence of graphitic kerogen often results in unusually low formation resistivity that cannot be explained by any conventional resistivity saturation evaluation. In some embodiments, saturation evaluation for graphitic kerogen bearing formations based on electromagnetic response are enabled, which may represent a significant improvement in petrophysical evaluations and reserve quantification.

It has been observed that highly mature kerogen bearing formations in the dry gas window can have a very low resistivity which cannot be explained using existing saturation equations or models. The resistivity can be less than 0.2 ohm-m in these relatively low-porosity formations. When resistivity values become this low, traditional computations of hydrocarbon saturation and hydrocarbon-in-place become unreliable and the formation is condemned as wet (e.g., water saturated) without further investigation. Moreover, it was found that when permittivity and conductivity are both high, the electromagnetic signal may be dominated by the effect of graphitic kerogen, which is conductive and often has a low aspect ratio (indicating plate-like or sheet-like particulate).

A model has been developed and is disclosed herein to explain the observed conductivity and permittivity in graphitic kerogen containing formations. The disclosed effective medium model describes both the conductivity and permittivity signals for formations containing water-wet graphitic kerogen. The model includes a solution for the polarization response of spheroidal conductive grains immersed in brine, which accounts not only for the geometric and conductive effects of the grain independently, but also the interplay between them. In addition to the usual petrophysical parameters, such as the water-phase tortuosity exponent, the brine salinity, and the water-filled porosity, the model may require the inputs of the volume fraction, the typical size (distribution), and a phenomenological aspect ratio of graphitic kerogen. The conductivity and permittivity predicted by the model are consistent with the EM response of highly mature kerogen-bearing formations.

In field applications, the volume fraction of graphitic kerogen can be obtained through advanced formation evaluation based on spectroscopy logs. Then, given the water-phase tortuosity exponent, the brine salinity, and a fixed size-distribution of graphitic kerogen, one can estimate the formation-water saturation together with the phenomenological aspect ratio of the graphitic kerogen, based on both the conductivity and permittivity signals at typical resistivity-tool frequencies. The model may therefore advantageously provide the foundation for an improved saturation interpretation of highly mature kerogen-bearing formations.

As noted above, the method described herein may advantageously be used to evaluate the water saturation of formations containing highly mature kerogen. As is known to those of ordinary skill, conventional resistivity saturation evaluation methods based on Archie's or shaly sand saturation equations cannot provide reliable interpretations due to the observed low resistivity in these formation. These conventional methods often over-estimate the water saturation (and therefore underestimate producible hydrocarbons). In contrast, the disclosed method utilizes both resistivity (conductivity) and permittivity measurements made at a single logging tool frequency (e.g., in the 10s or 100s of kHz as described in more detail below) and computes the formation water saturation with an effective medium model considering the polarization effect of graphitic kerogen immersed in brine. Correlations between conductivity and permittivity signals as predicted and interpreted by the model advantageously provide pathways for water saturation evaluations of highly mature kerogen bearing formations, where a reliable saturation equation has not previously existed.

The methods disclosed herein provide a model and associated workflow for the water saturation of formations containing graphitic kerogen. The method uses the conductivity and permittivity values derived from EM measurements of the formation, for example, in a frequency range from about 10 to about 200 kHz. The method also makes use of a volume fraction of graphitic kerogen in the formation that may be obtained, for example, from nuclear logging measurements such as spectroscopic gamma ray measurements. It will be understood that the disclosed embodiments are not limited to measurements made by any particular type or kind of EM logging tools as long as both conductivity and permittivity values can be determined from the measurement.

Turning now to FIG. 1 schematic plots (or representations) of subterranean formations used to model the subterranean formations of interest are depicted. The representation on the left hand side of the figure schematically depicts a conventional bimodal formation model in which the dielectric behavior of the formation is approximated by a bimodal distribution of spheres and oblate spheroid grains. The representation on the right hand side of the figure schematically depicts the formation model used to develop the disclosed methods and includes graphitic kerogen spheroids distributed in a bimodal distribution of spheres and oblate spheroid grains. The graphitic kerogen is approximated by conductive oblate spheroid particulate having major and minor radii, a and b as depicted (the major radius is a and the minor radius is b).

The EM response of a formation containing highly mature (graphitic) kerogen may be better understood by first solving for the polarization response of a single graphitic particle (or grain) immersed in a brine. The particle is approximated by a conductive oblate spheroid as shown in FIG. 1, which enables both the geometric shape (the aspect ratio of the grain) and the conduction effects of the grain to be accounted.

Polarization coefficients for graphitic grains immersed in brine were derived in this work. The derivation treated the graphitic grains as a dielectric material with conductivity $\sigma_g$ and relative permittivity $\epsilon_g$. The electric potential inside the particle was assumed to be governed by the Laplace equation, i.e., no net-free charge presence inside the conductive particle except at the boundary. This assumption implies that all the electrons or holes created (or, e.g., substantially all) upon the application of an external electric-field accumulate at the boundary of the particle instantaneously. In other words, the transient time for electrons or holes to move from bulk to the boundary is much shorter than any time scales associated with the frequency of the electromagnetic radiation used to make the EM measurements.

Derivation of the polarization coefficients also assumed no ionic and charge exchange between the graphitic particle (grain) and the brine (e.g., via oxidation and/or reduction reactions). This assumption leads to the accumulation of electrons/holes and anions/cations at the particle-liquid interface that induce a double layer upon the application of the external electric field that is responsible for the strong polarization effect.

Polarization coefficients for a graphitic grain (modeled as an oblate spheroid immersed in brine) with an electric field applied parallel to the long axis a of the grain $P_p^g$ and with the electric field applied normal to the long axis a of the grain $P_n^g$ may be expressed mathematically, for example, as follows:

$$P_p^g = \frac{1}{3} \frac{\varepsilon_g - \left(\varepsilon_w + i\frac{\varepsilon_g}{\omega\tau_D} g_p(h\beta, \xi_0)\right)}{L_p \varepsilon_g + (1-L_p)\left(\varepsilon_w + i\frac{\varepsilon_g}{\omega\tau_D} g_p(h\beta, \xi_0)\right)} \quad (1a)$$

$$P_n^g = \frac{1}{3} \frac{\varepsilon_g - \left(\varepsilon_w + i\frac{\varepsilon_g}{\omega\tau_D} g_n(h\beta, \xi_0)\right)}{L_n \varepsilon_g + (1-L_n)\left(\varepsilon_w + i\frac{\varepsilon_g}{\omega\tau_D} g_n(h\beta, \xi_0)\right)} \quad (1b)$$

where $\varepsilon_g = \epsilon_g + i\sigma_g/(\omega\epsilon_0)$ s the complex dielectric constant of the graphite grain with $\epsilon_g$ being the relative permittivity and $\sigma_g$ being the conductivity of the particle and $\varepsilon_w = \epsilon_w + i\sigma_w/(\omega\epsilon_0)$ is the complex dielectric constant of the formation water (the brine) with $\epsilon_w$ being the relative permittivity and $\sigma_w$ being the conductivity of the brine. As commonly used, $\omega$ is the radial frequency and $\epsilon_0$ is the vacuum permittivity.

With continued reference to Equations 1a and 1b, the depolarization factors, $L_p$ and $L_n$, parallel to and normal to the symmetry axis (the major axis a) are determined (e.g., only determined) by the shape of the graphitic grain (e.g., the aspect ratio b/a). For an oblate spheroid, $L_n = (1-L_p)/2$. It is also convenient to define $L_p = 1 - \delta_g$ where $\delta_g$ is further related to geometric parameter $\xi_0$ as follows:

$$\delta_g = \xi_0 \left(1 + \xi_0^2\right) \frac{dQ_1(i\xi_0)}{d\xi_0} \quad (2)$$

where the $Q_\ell(x)$ is a Legendre function of the second kind. The geometric parameter $\xi_0$ is the radius of the spheroid in the spheroidal coordinate system and is related to the aspect ratio (the ratio of the minor to the major axes) as follows: $b/a = \sqrt{\xi_0^2/(1+\xi_0^2)}$. For a plate-like or sheet-like particle in which $0 < \xi_0 << 1$, $\xi_0$ is approximately equal to the aspect ratio (i.e., $\xi_0 \approx b/a$).

With further reference to Equations 1a and 1b, $\tau_D$ is the characteristic time of ion dynamics in the electrolyte (the brine) and may be represented as follows:

$$\tau_D = \frac{\epsilon_0 \epsilon_w}{\sigma_w} = \frac{\lambda_D^2}{D} \quad (3)$$

where $\lambda_D$ is the Debye length and D is the diffusion coefficient of ions in the brine.

With still further reference to Equations 1a and 1b, $g_p(h\beta, \xi_0)$ and $g_n(h\beta, \xi_0)$ are functions of $\xi_0$ and $h\beta$ for the parallel and normal polarization coefficients. Here, h is the half-distance between two foci of the oblate spheroid, and $\beta$ is the inverse decaying length scale defined as:

$$\beta^2 = \frac{1}{\lambda_D^2}(1 - i\omega\tau_D) \quad (4)$$

To the lowest non-trivial order, the functional form of $g_p(h\beta, \xi_0)$ in Eq. (1a) is given by:

$$g_p(h\beta, \xi_0) = -\frac{1}{\xi_0} \frac{Q_1(i\xi_0)}{\left(\frac{dQ_1(i\xi_0)}{d\xi_0}\right)} \frac{1 + h\beta\varpi_{p,1}}{1 + h\beta\varpi_{p,1} + (h\beta)^2 \varpi_{p,2}} \quad (5)$$

with $$\varpi_{p,2} = \frac{Q_3(i\xi_0)}{25Q_1(i\xi_0)} - \frac{1}{6Q_1(i\xi_0)} - \frac{\left(\frac{dQ_3(i\xi_0)}{d\xi_0}\right)}{25\left(\frac{dQ_1(i\xi_0)}{d\xi_0}\right)} \quad (6a)$$

$$\varpi_{p,1} = \frac{i}{9\varpi_{p,2}} \left( \frac{P_1(i\xi_0)}{Q_1(i\xi_0)} - \frac{\left(\frac{dP_1(i\xi_0)}{d\xi_0}\right)}{\left(\frac{dQ_1(i\xi_0)}{d\xi_0}\right)} \right) \quad (6b)$$

where $P_\ell(x)$ is a Legendre function of the first kind.

In the direction normal to the symmetry axis, the function $g_n(h\beta, \xi_0)$ in Equation 1b is given by:

$$g_n(h\beta, \xi_0) = -\frac{\left(\frac{dP_1^1(i\xi_0)}{d\xi_0}\right)}{P_1^1(i\xi_0)} \frac{Q_1^1(i\xi_0)}{\left(\frac{dQ_1^1(i\xi_0)}{d\xi_0}\right)} \frac{1 + h\beta\varpi_{n,1}}{1 + h\beta\varpi_{n,1} + (h\beta)^2 \varpi_{n,2}} \quad (7)$$

with $$\varpi_{n,2} = \frac{Q_3^1(i\xi_0)}{75Q_1^1(i\xi_0)} - \frac{Q_{-1}^1(i\xi_0)}{3Q_1^1(i\xi_0)} - \frac{\left(\frac{dQ_3^1(i\xi_0)}{d\xi_0}\right)}{75\left(\frac{dQ_1^1(i\xi_0)}{d\xi_0}\right)} + \frac{\left(\frac{dQ_{-1}^1(i\xi_0)}{d\xi_0}\right)}{3\left(\frac{dQ_1^1(i\xi_0)}{d\xi_0}\right)} \quad (8a)$$

$$\varpi_{n,1} = -\frac{2i}{9\varpi_{n,2}} \left( \frac{P_1^1(i\xi_0)}{Q_1^1(i\xi_0)} - \frac{\left(\frac{dP_1^1(i\xi_0)}{d\xi_0}\right)}{\left(\frac{dQ_1^1(i\xi_0)}{d\xi_0}\right)} \right) \quad (8b)$$

where $P_\ell^m(i\xi_0)$ and $Q_\ell^m(i\xi_0)$ are associated Legendre functions of the first and second kind, respectively.

The polarization coefficients given in Equations 1a and 1b approximate the polarization response of conducting particles (such as graphitic kerogen) immersed in a brine and account for the interplay of the particle geometry and its conductive nature. At logging tool frequencies (noted above) these coefficients enable a more faithful model of the subterranean formation that better captures the conductivity and permittivity response of graphitic kerogen bearing formations for the saturation interpretation.

The polarization coefficients given above (which describe the polarization response of graphitic kerogen particulate immersed in a brine) are incorporated into an effective medium model to model the saturation response of a mature graphic kerogen containing formation. For the purposes of facilitating a better understanding, the effective medium model may be thought of as including two major components (or as being developed in two major steps). The first includes the conductivity response affected by the conventional water phase tortuosity and may be captured by the bimodal or Stroud-Milton-De (SMD) models or any other reasonable dielectric dispersion model that allows the adjustment of so-called cementation exponents. The second includes the EM response due to the presence of the highly mature (graphitic) kerogen particulate that may be captured by further mixing non-spherical (spheroidal), conductive particles into the dielectric medium background obtained in the first step. This results in a dilute mixture of graphitic kerogen particulate in the bimodal or SMD model. In the discussion that follows the bimodal model is used in the first step to establish the dielectric background medium. In the second step, the conventional Maxwell Garnett mixing formula is used to incorporate the graphitic kerogen particulate into the bimodal model. This approach is depicted schematically in FIG. 1 in which the left hand side of the figure depicts the bimodal model and the right hand side of the figure depicts the bimodal model with the dilute inclusion of spheroidal graphitic kerogen particulate.

The bimodal model was designed to capture the so-called Maxwell-Wagner polarization due to the texture effect of rock grains (Kenyon, *Texture effects on megahertz dielectric properties of calcite rock samples*, J. Applied Physics, 55(8) 3153-3159, 1984), and is often used to describe the dielectric dispersion of a formation in the frequency range of 10 MHz and 1 GHz. However, it can be utilized at lower frequencies (e.g., at induction and propagation logging frequencies) where the model includes a mixture of two types of rock grains, non-charged dielectric spheres and non-charged dielectric oblate spheroids with a single aspect ratio, into the water/brine phase. Through the construction of a differential effective medium approximation, the predicted dielectric response of the bimodal model is obtained as the implicit solution by the following functional form:

$$\phi_{BM} = \prod_{i=0}^{3}\left(\frac{\varepsilon_w - r_i}{\varepsilon_{BM} - r_i}\right)^{p_i} \quad (9)$$

where $$\varepsilon_{BM} = \epsilon_{BM} + i\sigma_{BM}/(\omega\epsilon_0)$$

is the complex dielectric constant of the background medium predicted by the bimodal model with $\epsilon_{BM}$ being the relative permittivity and $\sigma_{BM}$ being the conductivity and $\phi_{BM}$ is the water filled porosity (of the bimodal model). The $r_i$ are the poles and the $p_i$ are the residues of the function $1/(3\varepsilon F(\varepsilon))$, where $F(\varepsilon)$ is the sum of polarization coefficients of the mixed particles weighted by their fraction and is given by:

$$F(\varepsilon) = (1-p)P_s(\varepsilon) + \frac{p}{3}\left(P_p^{BM}(\varepsilon) + 2P_n^{BM}(\varepsilon)\right) \quad (10)$$

where p is the volume fraction of the non-charged oblate spheroid in the rock matrix.

With further reference to Equation 10, the polarization coefficient of a sphere with the dielectric constant $\epsilon_m$ mixed into a lossy dielectric background with a complex dielectric constant, $\varepsilon$, is given by:

$$P_s(\varepsilon) = \frac{\epsilon_m - \varepsilon}{\epsilon_m + 2\varepsilon} \quad (11)$$

Similarly, $P_p^{BM}$ and $P_n^{BM}$ are polarization coefficients of an oblate spheroid mixed into a lossy dielectric background with the applied electric field parallel and normal to the symmetry axis, respectively, for the bimodal model and are given by:

$$P_{p,n}^{BM}(\varepsilon) = \frac{1}{3}\frac{\epsilon_m - \varepsilon}{L_{p,n}^{BM}\epsilon_m + (1 - L_{p,n}^{BM})\varepsilon} \quad (12)$$

The $L_{p,n}^{BM}$ are depolarization factors of the spheroid as described above with respect to Equation 2. In general, the modeled graphite and inert rock grains have different aspect ratios such that $L_p^{BM} = 1 - \delta_{BM}$ (as also described above with respect to Equation 2) where $\delta_{BM}$ represents the geometric factor for the bimodal model.

One of the petrophysical parameters provided by the bimodal model is the water phase tortuosity exponent (associated with the Archie's exponent in fully water-saturated cases). This water phase tortuosity exponent sums the tortuosity contributions from both the spherical and the oblate spheroidal grains in the bimodal model and is given by:

$$w = \frac{3}{2}(1-p) + p\frac{2+3\delta_{BM}}{3\delta_{BM}(2-\delta_{BM})} \quad (13)$$

Within the bimodal model, this water phase tortuosity exponent is larger (e.g., always larger) than 3/2 (1.5) in the absence of spheroids, i.e., when p=0. With most formations in nature having a tortuosity exponent in the range 1.5<w<2.5, the bimodal model can be used to capture the pure texture effect to the conductivity and dielectric response of the background medium in the absence of graphitic kerogen.

In the second step of establishing the effective medium model, the graphitic kerogen grains, represented by conductive oblate spheroids (as described above), are mixed into the lossy dielectric background expressed above using the bimodal model. By adding a volume fraction $f_g$ of the graphitic kerogen, the final water-filled porosity becomes $\phi_w = \phi_{BM}(1-f_g)$. The Maxwell Garnet mixing formula for graphitic kerogen grains added into the bimodal model background is given by:

$$\varepsilon_r = \varepsilon_{BM}\left(1 + \frac{f_g\Sigma_i^N \varrho_i(P_{p,i}^g + 2P_{n,i}^g)}{1 - f_g\Sigma_i^N \varrho_i(L_p^g P_{p,i}^g + 2L_n^g P_{n,i}^g)}\right) \quad (14)$$

where $$\varepsilon_r = \epsilon_r + i\sigma_r/(\omega\epsilon_0)$$

is the complex dielectric constant of the rock (i.e., the graphitic kerogen containing formation) with $\epsilon_r$ being the relative permittivity and $\sigma_r$ being the conductivity of the rock (formation) and the index i represents particle groups with different sizes and aspect ratios. It will be understood that as disclosed herein $\epsilon_r$ and $\sigma_r$ represent the measured permittivity and conductivity of the formation (i.e., the inputs to the model as described in more detail below).

To simplify the model, it may be assumed that the aspect ratios of different sized graphitic kerogen particles are the same, i.e. a constant $\xi_0$, and that $\varrho_i$ is a discretized lognormal distribution that can be represented by the following probability distribution function (PDF):

$$PDF(\ln d; \mu, \sigma_{ln}) = \frac{1}{\sqrt{2\pi}\sigma_{ln}}\exp\left[\frac{-(\ln d - \mu)^2}{2\sigma_{ln}^2}\right] \quad (15)$$

Note that the fraction of different sized graphitic kerogen particles are logarithmically spaced with d=2h representing the particle size, and $\mu$ and $\sigma_{ln}$ representing the mean and the variance of the log-normal distribution in logarithmic space.

To briefly summarize, the proposed effective medium model for the complex conductivity is governed by the following petrophysical parameters: the water filled porosity $\phi_w$, the brine salinity $Sal_w$ that determines the complex conductivity of brine $\varepsilon_w$ given the formation temperature and pressure (T and P) (Klein and Swift, *An improved model for the dielectric constant of seawater at microwave frequencies*, IEEE Transactions on Antennas and Propagation, 25(1), 104-111, 1977); and the water phase tortuosity exponent w. With the choice of p=0.05 (i.e., 5% volume fraction of the non-charged oblate spheroid), w defines the aspect ratio parameter $\xi_B$ of the bimodal model via Equations 2 and 13. The model is further governed by the graphitic kerogen volume fraction $f_g$ in terms of total formation volume; the geometric parameter $\xi_0$ of the graphitic kerogen (which is approximately equal to the aspect ratio for plate-like or sheet-like graphitic kerogen particulate as described above), and mean $\mu$ and variance $\sigma_{ln}$ of the graphitic kerogen size distributions. The following standard values may also be input into the model: the relative permittivity of the graphitic kerogen $\varepsilon_g$=10-15, the conductivity of the graphitic kerogen $\sigma_g \approx 10^5$ S/m, and the rock matrix relative permittivity, $\varepsilon_{BM}$=4.6-9. The exact value of these material parameters is not as crucial to the modeled dielectric response as is the more substantial polarization response due to the presence of graphitic kerogen.

Figure 2A:
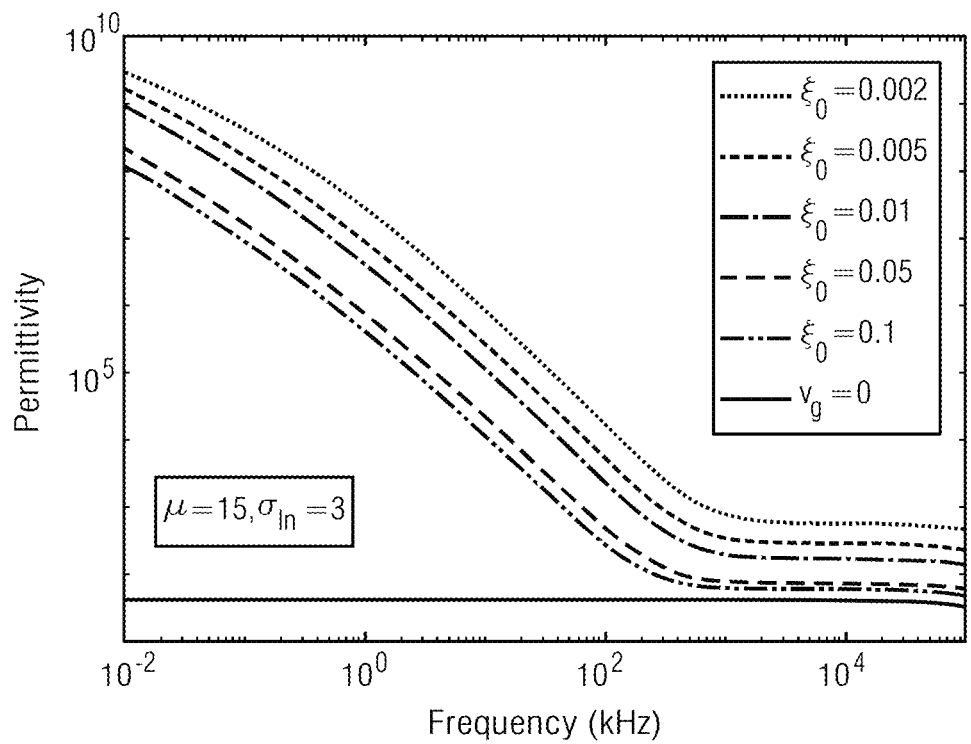
FIGS. 2A and 2B depict graphs of predicted permittivity (2A) and conductivity (2B) versus frequency with varying values of $\xi_0$.
Figure 2B:
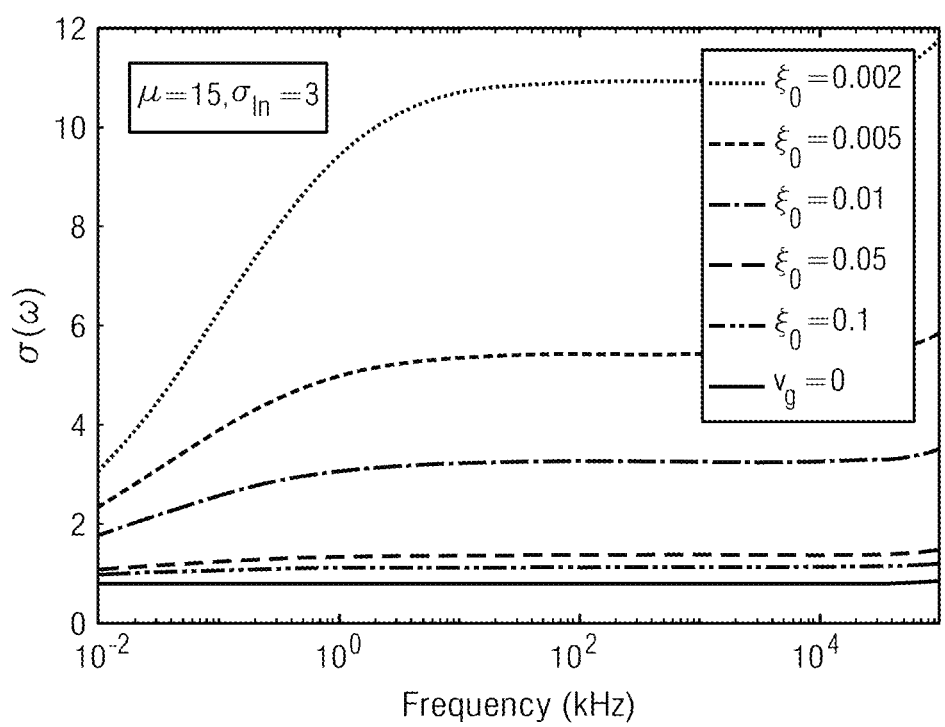

Examples of permittivity and conductivity responses predicted by the model as a function of frequency are depicted in FIGS. 2A, 2B, 3A and 3B. In FIGS. 2A and 2B, the influence of the aspect ratio to the permittivity and conductivity response is demonstrated by varying the value of $\xi_0$ with the following parameters held constant: the water-filled porosity $\phi_w$=0.1, the brine salinity 300 parts per thousand (ppk), w≈1.96, $\mu$=15, $\sigma_{ln}$=3 and $f_g$=0.03. Note that smaller values of $\xi_0$ corresponding to platier graphitic kerogen grains give rise to a stronger conductivity and permittivity response at all frequencies as depicted.

Figure 3A:
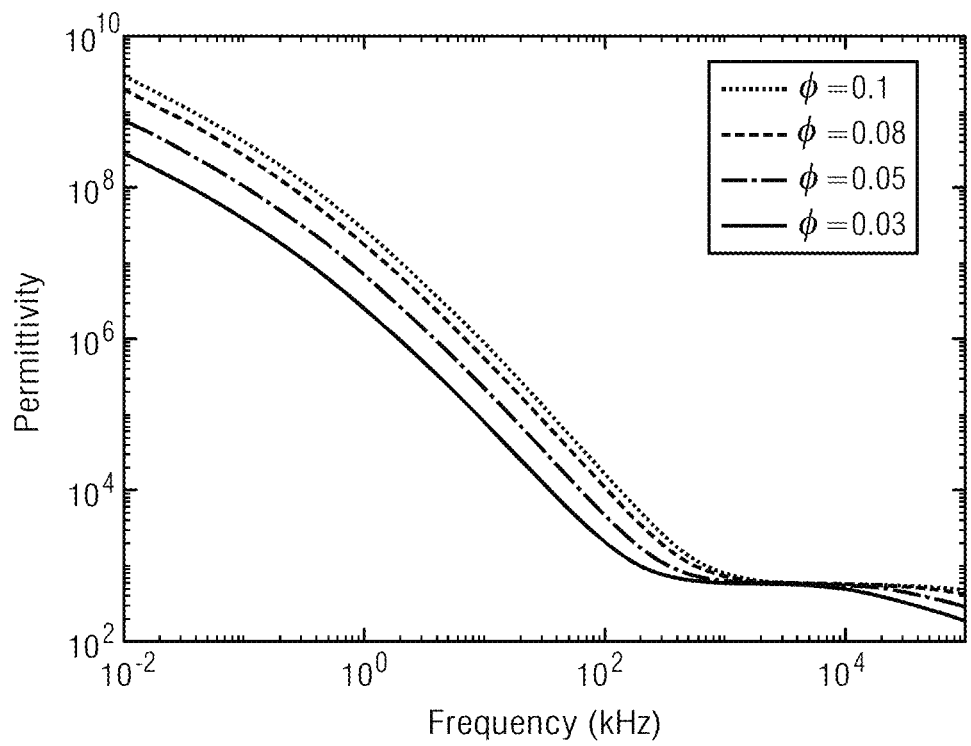
FIGS. 3A and 3B depict graphs of predicted permittivity (3A) and conductivity (3B) versus frequency with varying values of $\phi_w$.
Figure 3B:
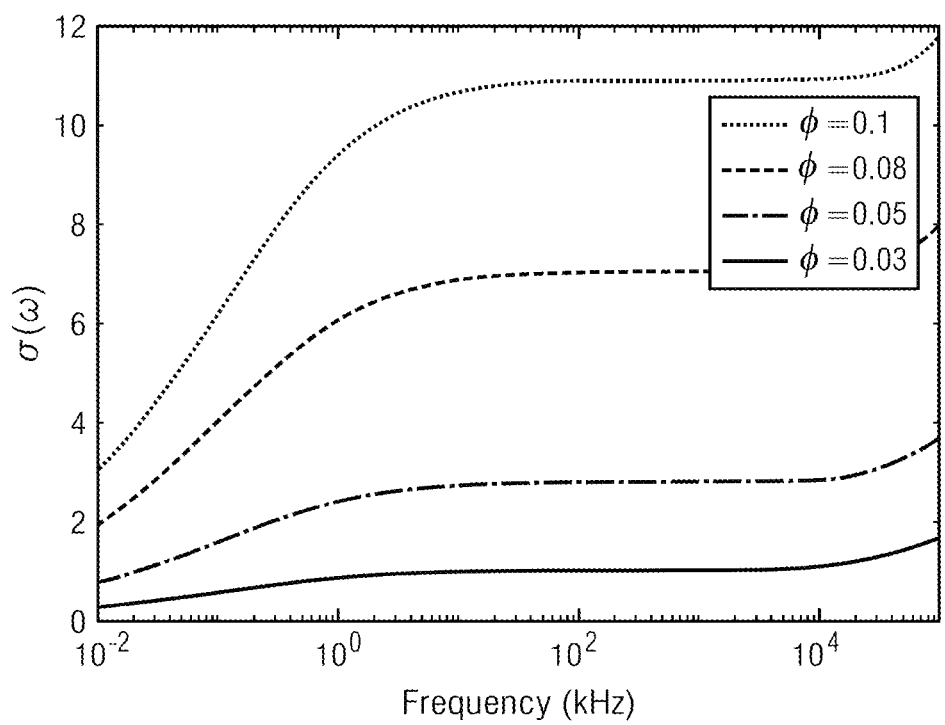

In FIGS. 3A and 3B, the influence of the water filled porosity $\phi_w$ to the permittivity and conductivity response is demonstrated by varying the value of $\phi_w$ with the following parameters held constant: the aspect ratio parameter $\xi_0$=0.002, the brine salinity 300 ppk, w≈1.96, $\mu$=15, $\sigma_{ln}$=3 and $f_g$=0.03. As expected, formations with higher water filled porosity are shown to have stronger permittivity and conductivity responses (particularly the conductivity response at all frequencies).

As known to those of ordinary skill in the art, many EM logging tools make electromagnetic measurements at a single frequency and measure a complex voltage (having attenuation and phase change characteristics) from which both the formation conductivity and permittivity can be determined. In some embodiments, it will be understood that since conventional EM measurements commonly include only two data points (attenuation and phase change or conductivity and permittivity) measured at a single frequency that only two modeling parameters can be inferred from the measurements. In the disclosed embodiments, the measured conductivity and permittivity values are used to invert the model (i.e., solve) for the water-filled porosity $\phi_w$ and the aspect ratio parameter $\xi_0$. The remaining parameters described above are either fixed a priori or used as input variables. For example, suitable values of $\mu$ and $\sigma_{ln}$ for the size distribution may be determined through field calibration or an a priori set of optimal values. The remaining petrophysical parameters, such as the brine salinity, the water phase tortuosity exponent w, the temperature and pressure of the downhole condition, and the volume fraction of graphitic kerogen $f_g$ are inputs and may be obtained via measurement.

Figure 4A:
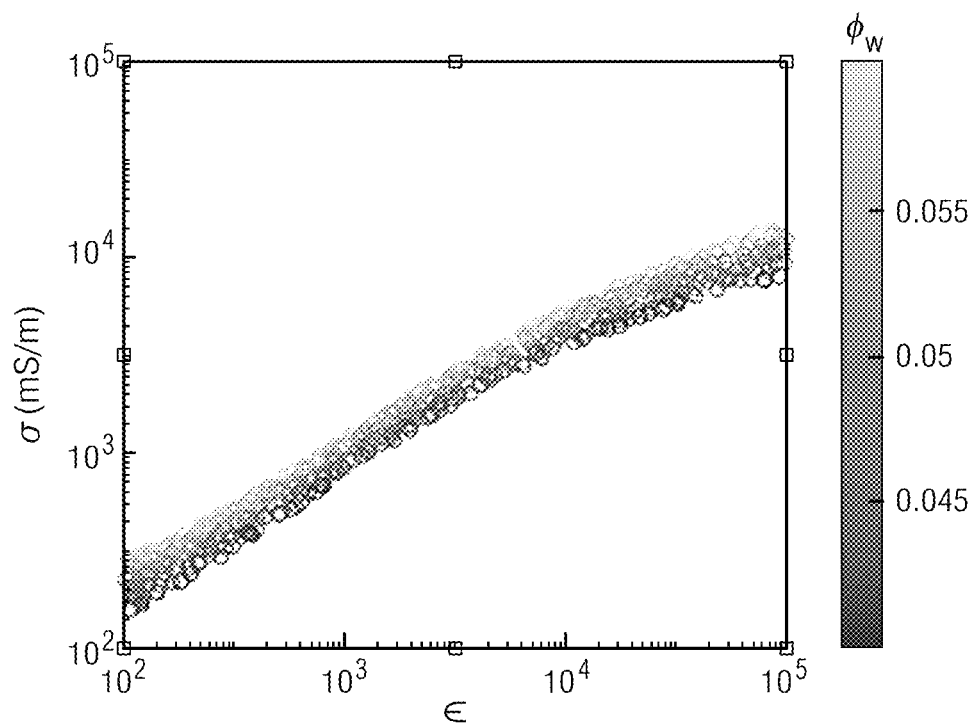
FIGS. 4A and 4B depict cross plots of conductivity versus permittivity as a function of water filled porosity $\phi_w$ (4A) and the aspect ratio parameter $\xi_0$ (4B).
Figure 4B:
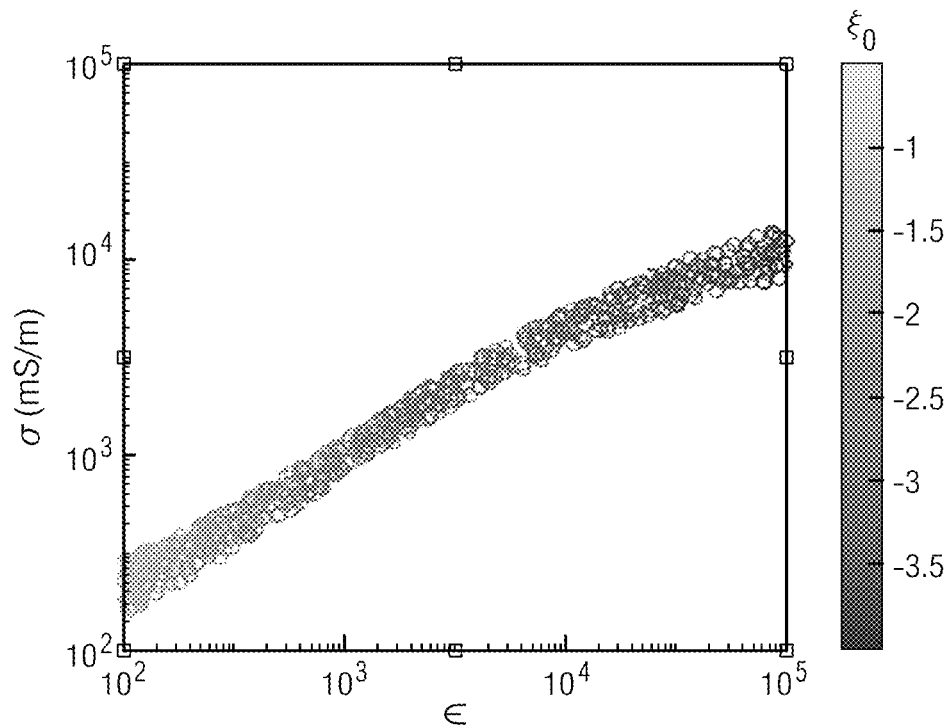

FIGS. 4A and 4B depict cross plots of conductivity versus permittivity of the model predicted at 20 kHz as a function of water filled porosity $\phi_w$ (4A) and the aspect ratio parameter $\xi_0$ (4B). These plots demonstrate the interplay between these two desired inversion parameters with all other parameter values fixed. Distinct responses to these two parameters are observed. First, in order for the formation to have both high conductivity and high permittivity the model requires that the graphitic kerogen particles have a low aspect ratio $\xi_0$<<1). And second, formation conductivity is shown to be a stronger function of $\phi_w$ than formation permittivity. Since these two parameters influence the EM response in distinctly different ways, a stable interpretation of the water-filled porosity based on the conductivity and permittivity is expected.

Figure 5A:
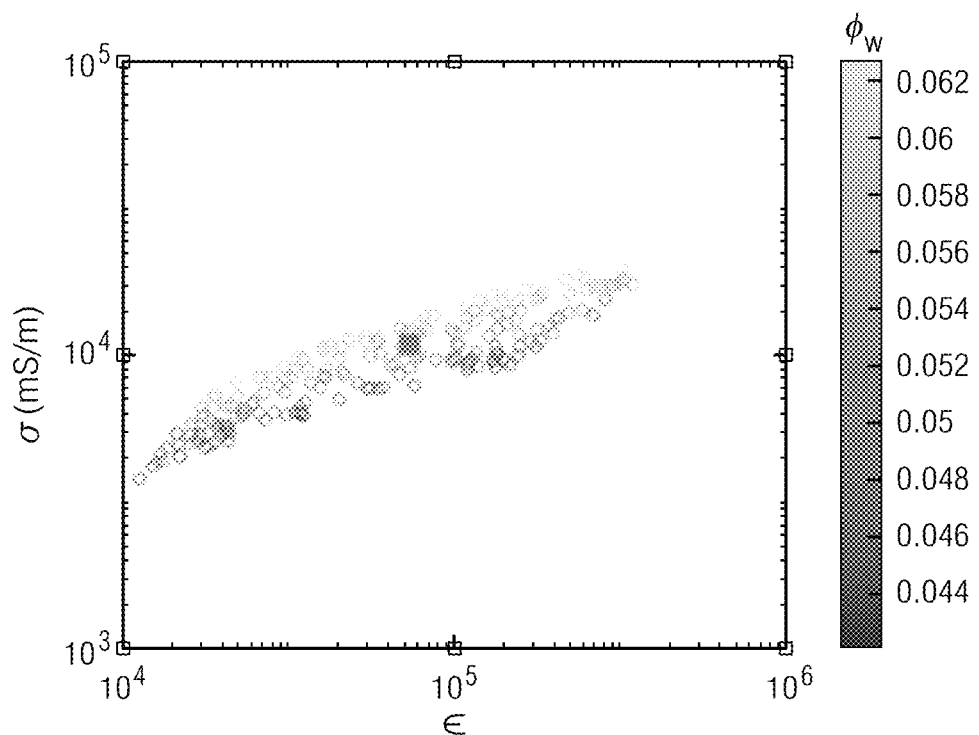
FIGS. 5A, 5B, 6A, 6B, 7A and 7B depict cross plots of conductivity versus permittivity comparing model predictions and three field data examples.
Figure 5B:
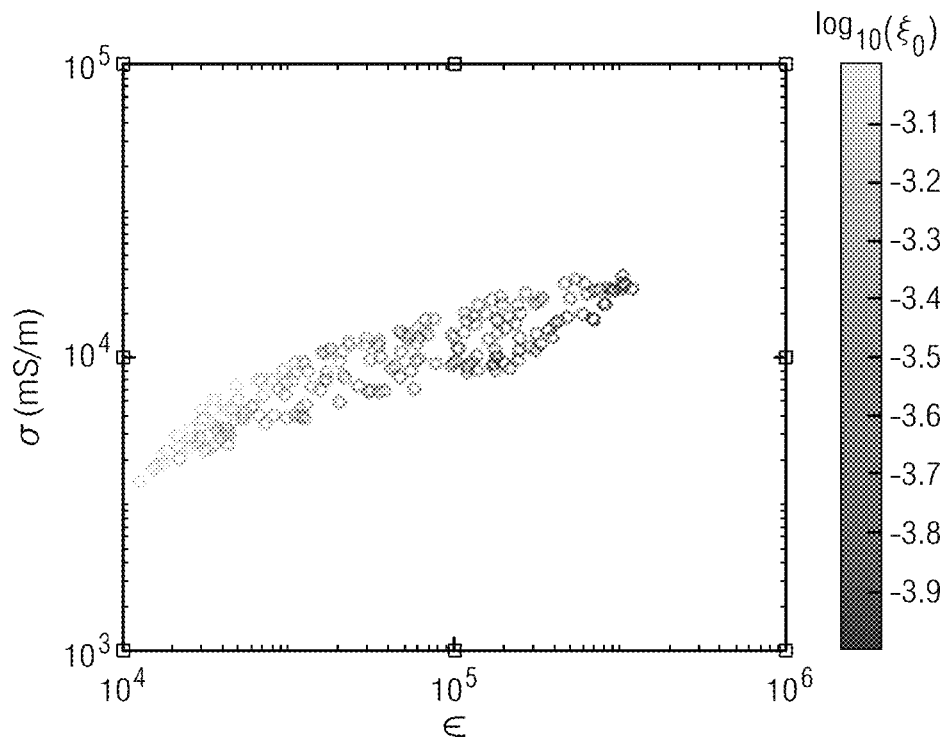
Figure 6A:
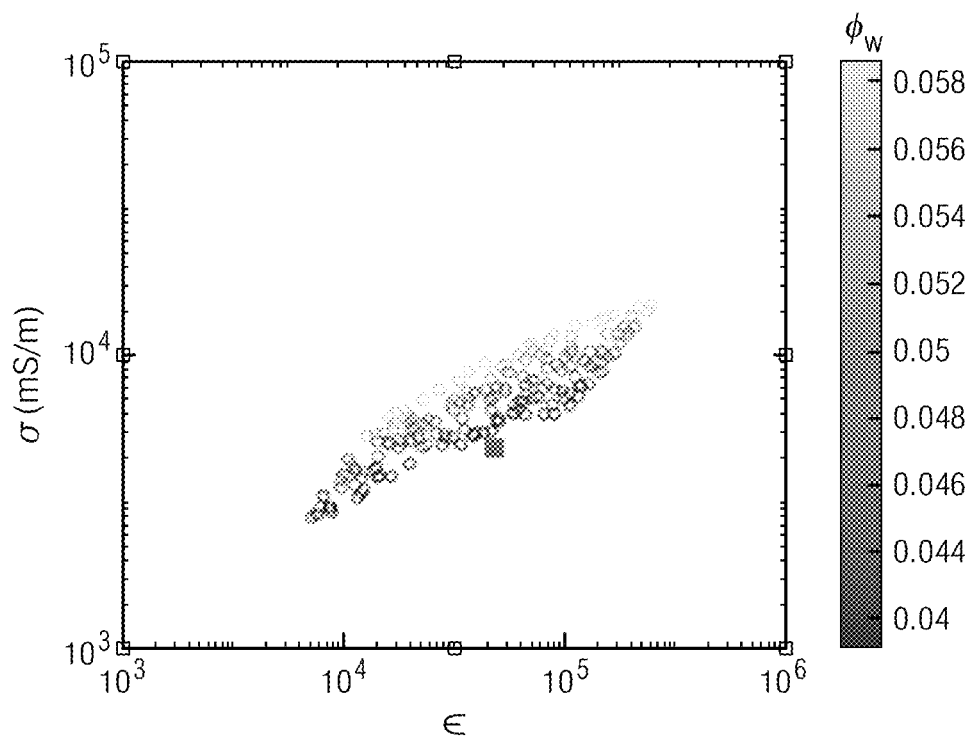
Figure 6B:
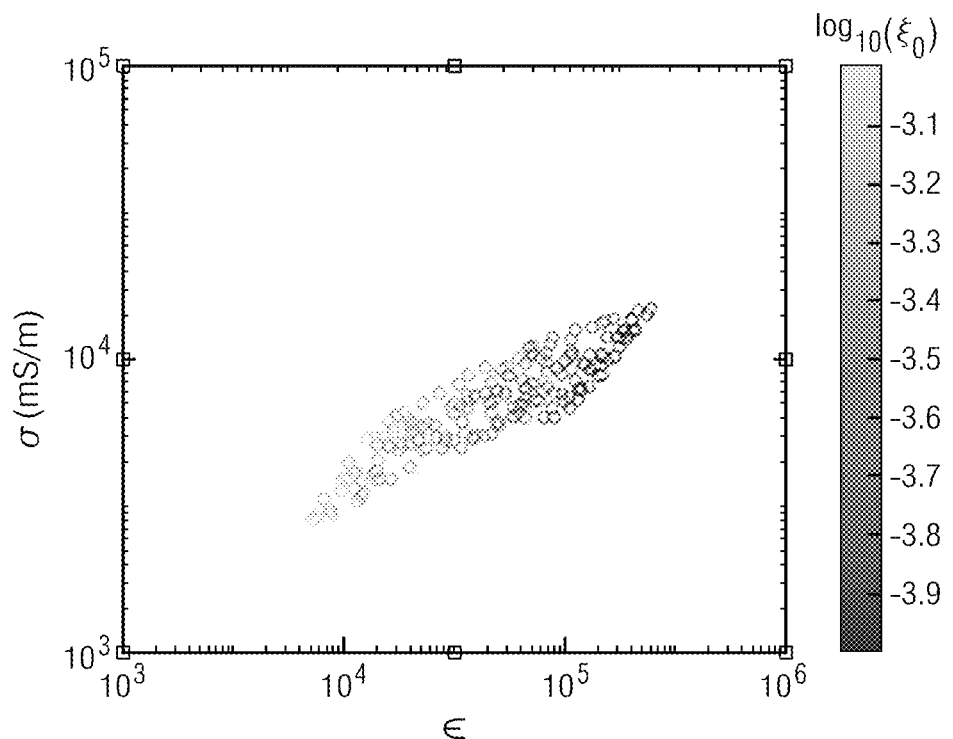
Figure 7A:
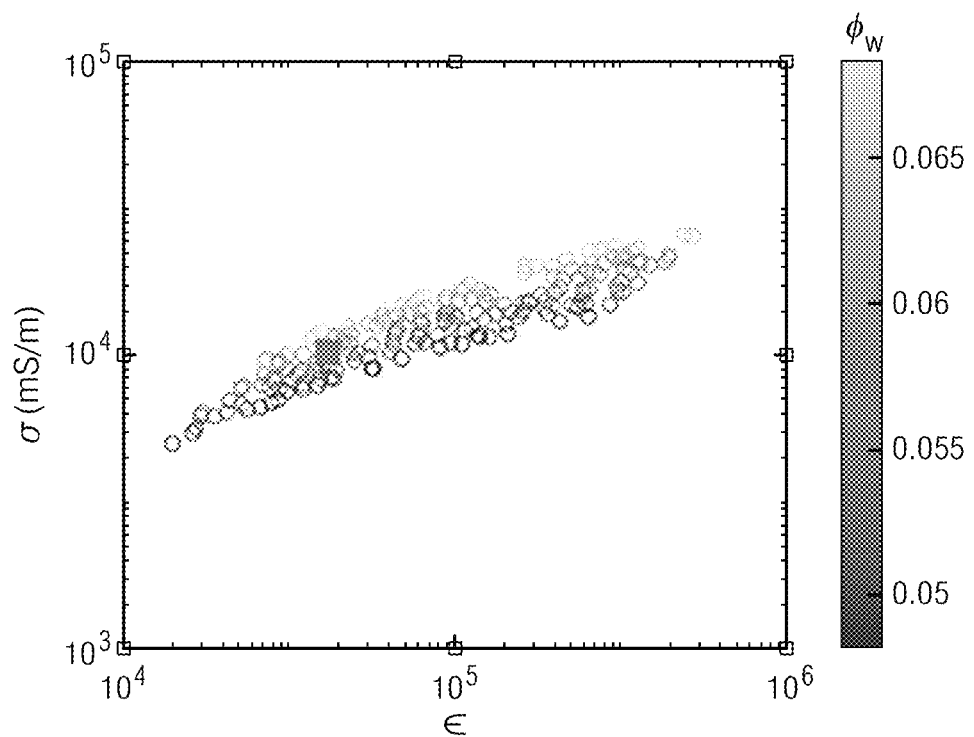
Figure 7B:
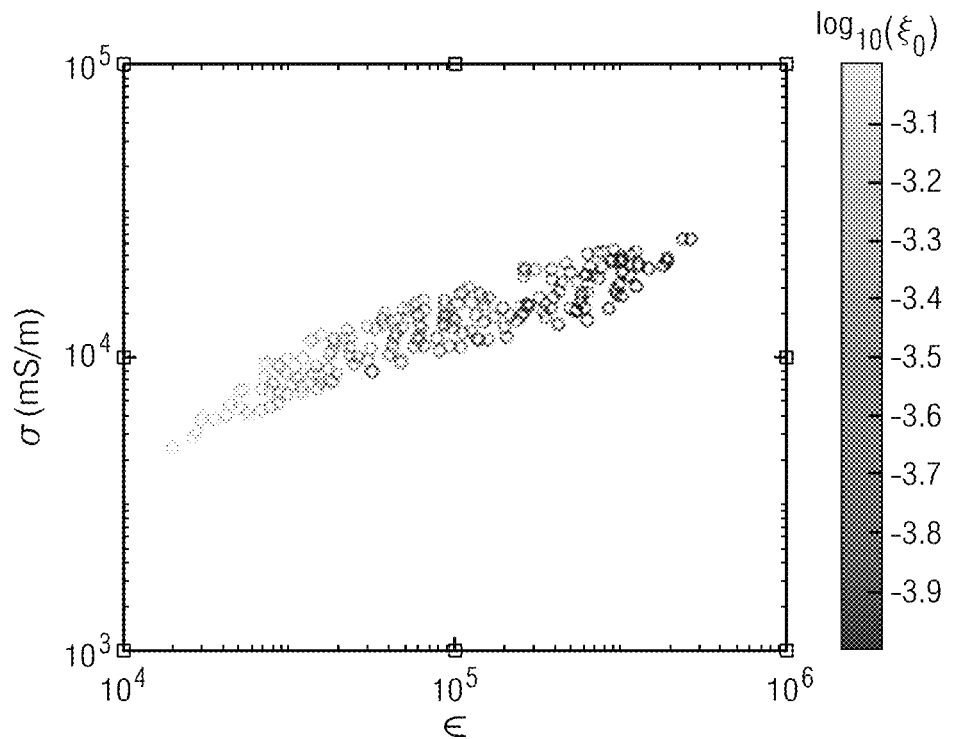

FIGS. 5A, 5B, 6A, 6B, 7A and 7B depict cross plots of conductivity versus permittivity comparing model predictions and three field data examples (and using both field attainable and reasonable modeling parameters). The field data, shown in square points in FIGS. 5A, 6A, and 7A represent the averaged conductivity and permittivity values within the same formation type from different US land wells (a first land well in FIG. 5A, a second land well in FIG. 6A, and a third land well in FIG. 7A). Note that the modeled permittivity and conductivity values obtained by varying $\phi_w$ and $\xi_0$ fall in the range of the average measured values for the US land wells. In particular, the water-filled porosity $\phi_w$ used in the model is very close to the benchmarked water-filled porosity from the field data, without the tuning of $\mu$ and $\sigma^{ln}$ values. This shows the promise of the saturation evaluation based on the permittivity and conductivity signals together with the effective medium models for graphitic kerogen bearing formations.

With reference to FIGS. 5A and 5B, the brine salinity, the well temperature and pressure, the graphitic volume fraction $f_g \approx 0.04$, and the benchmarked water-filled porosity $\phi_{w,B} \approx 0.055$ were extracted from the available field information and interpretation. With reference to FIGS. 6A and 6B, the brine salinity, the well temperature and pressure, the graphitic volume fraction $f_g \approx 0.035$, and the benchmarked water-filled porosity $\phi_{w,B} \approx 0.05$ were extracted from the available field information and interpretation. And with reference to FIGS. 7A and 7B, the brine salinity, the well temperature and pressure, the graphitic volume fraction $f_g \approx 0.045$, and the benchmarked water-filled porosity $\phi_{w,B} \approx 0.06$ were extracted from the available field information and interpretation.

Figure 8:
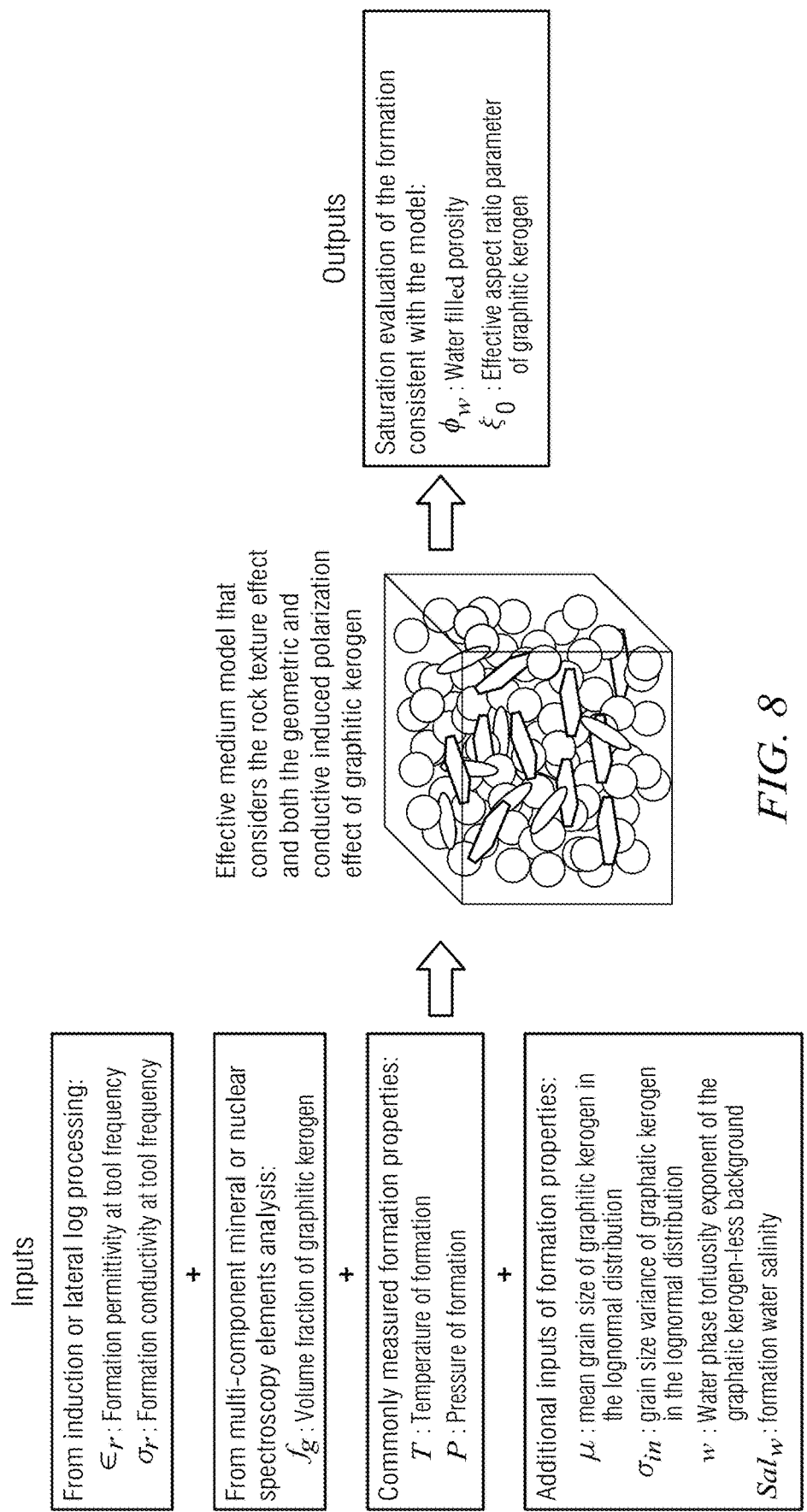
FIG. 8 depicts a first schematic workflow.
Figure 9:
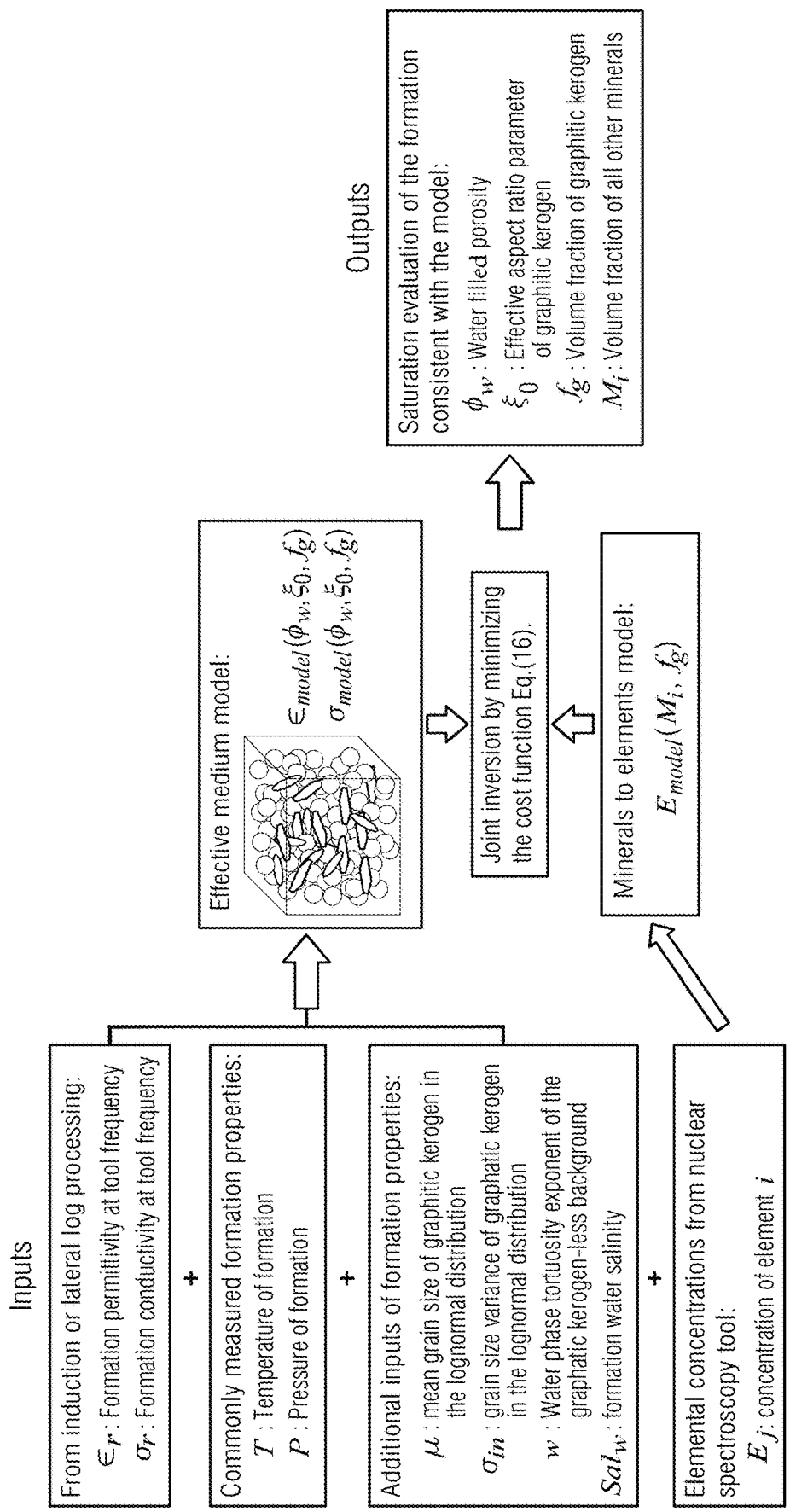
FIG. 9 depicts a second schematic workflow.
Figure 10:
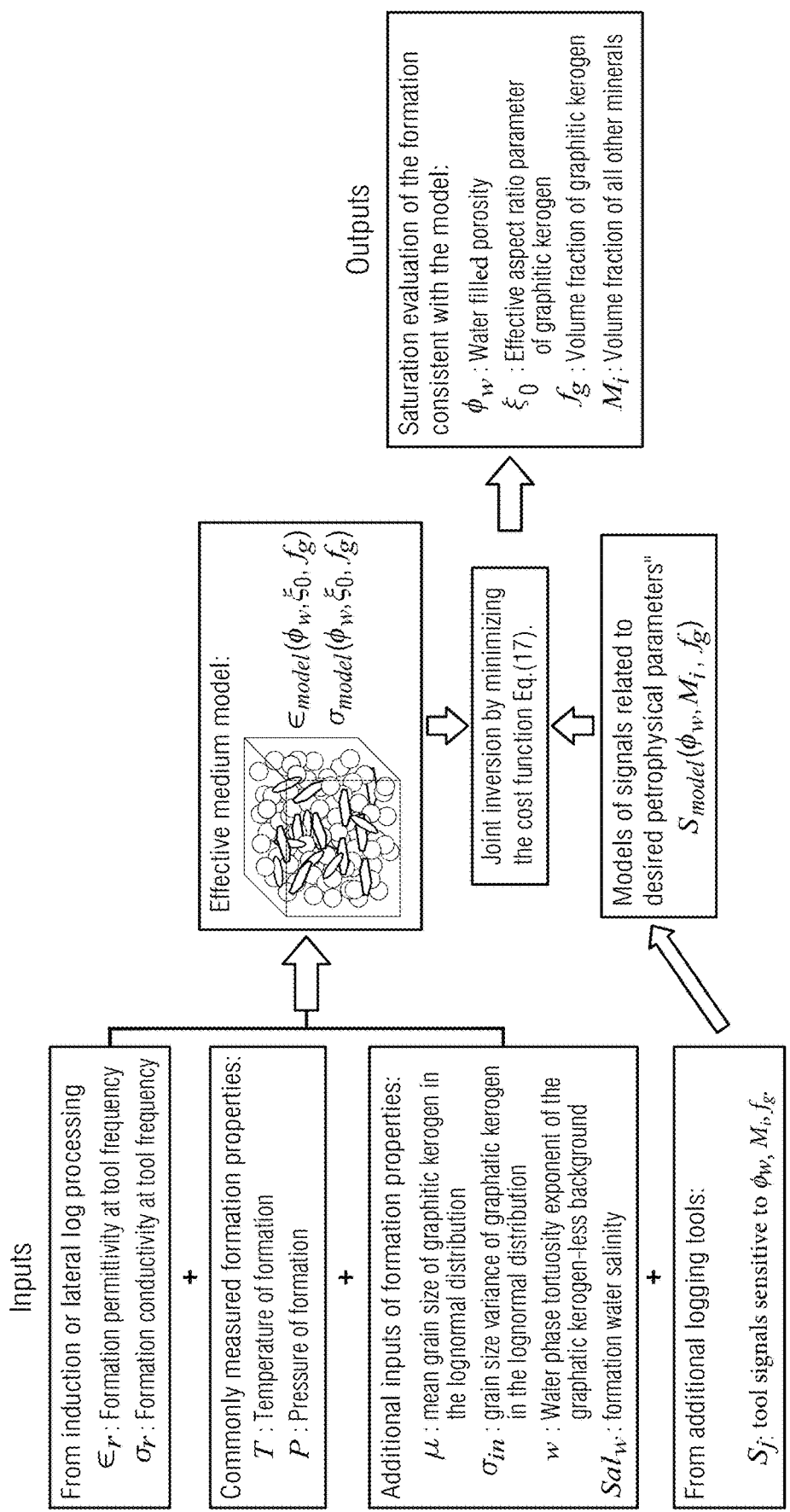
FIG. 10 depicts a third schematic workflow.

Turning now to FIGS. 8-10 other work flows (methods) are depicted for implementing the above described model to determine water saturation of a mature graphitic kerogen containing formation. As depicted in FIG. 8, in some embodiments the water saturation of the graphitic kerogen bearing formation may be evaluated by directly solving (inverting) the model for the unknown $\sigma_w$ and $\xi_0$ parameters consistent with the measured permittivity and conductivity at the tool frequency. As indicated in the figure a number of inputs are made into the model (on the left hand side of the figure). These inputs are then processed (e.g., via numerical inversion methods such as minimizing a cost function) to compute $\sigma_w$ and $\xi_0$ (as depicted on the right hand side of the figure).

With continued reference to FIG. 8, the inputs include formation measurements and other inputs that are known (or assumed) a-priori (e.g., based on knowledge of the field, the formation type, or other sources of information). As described above, these other inputs may include $\mu$ and $\sigma_{ln}$ which represent the mean and grain size variance of the graphitic kerogen in the a log-normal distribution (e.g., as described above with respect to Equation 15). These other inputs may further include w which represents a water phase tortuosity exponent of the graphitic kerogen-less background (e.g., the water phase tortuosity of the background bimodal distribution as described in more detail above with respect to Equation 13). These other inputs may still further include the formation water salinity (i.e., the brine salinity $Sal_w$). The brine salinity may be obtained for example from various measurements made at the rig site (known to those of ordinary skill) or from a-priori knowledge of the formation characteristics.

The inputs to the model may also be based on various logging measurements. For example, downhole temperature and pressure measurements are commonly made during drilling and/or logging operations. These temperature and pressure measurements may be averaged or otherwise processed to compute formation temperature T and pressure P values that are also input into the model. It will be understood, however, that the formation temperature and pressure measurements and the brine salinity are not necessarily input into the effective medium model (e.g., the model described above with respect to Equation 14). For example, the temperature, pressure, and brine salinity values may be input into another model (e.g., a water/brine dielectric model as disclosed in Klein and Swift) to compute a complex dielectric constant of the brine ($\varepsilon_w = \epsilon_w + i\sigma_w/(\omega\epsilon_0)$—including a relative permittivity and a conductivity of the brine). This complex value (including the permittivity and the conductivity) may be input into the effective medium model.

The measured inputs may further include $f_g$ which represents the volume fraction of graphitic kerogen in the kerogen containing formation. This parameter is commonly in a range from about 1 to about 10 percent but is not limited in this regard. The volume fraction of kerogen may be obtained from various sources, but may be advantageously obtained from nuclear logging measurements (e.g., spectroscopic gamma ray logging measurements) from which an elemental distribution of the formation can be estimated. As known to those of ordinary skill in the art, the determined elemental distribution may be input into a conventional elements to minerals model to compute the mineral composition of the formation including the volume fraction of graphitic kerogen (which is then input into the effective medium model). One suitable logging tool for determining the volume fraction of graphitic kerogen is the LithoScanner® available from Schlumberger Technology Corporation.

With continued reference to FIG. 8, the measured inputs further include the complex dielectric constant $\varepsilon_r$ of the formation. In particular the measured inputs further include $\epsilon_r$ and $\sigma_r$ which represent the relative dielectric permittivity and the conductivity of the subterranean formation (it will be understood that the dielectric referred to herein is simply the permittivity). These parameters may be obtained, for example, from various electromagnetic logging measurements including wireline induction logging measurements (e.g., at a frequency in a range from about 1 to about 100 kHz) and logging while drilling propagation measurements (e.g., made at a frequency in a range from about 100 kHz to about 2 MHz). While the disclosed embodiments are expressly not limited in this regard, EM measurements made at a frequency in a range from about 10 kHz to about 200 kHz (e.g., 20 kHz induction measurements or 100 kHz propagation measurements) may advantageously provide the most accurate determination of $\sigma_w$ and $\xi_0$.

Those of ordinary skill in the art will readily appreciate the electromagnetic logging measurements are commonly made by deploying an electromagnetic measurement tool having at least one transmitter (transmitting antenna) and at least one receiver (receiving antenna) in a subterranean wellbore penetrating the graphitic kerogen bearing subterranean formation. To make the EM measurements, the transmitting and receiving antennas are electromagnetically coupled via applying a time varying electric current (an alternating current) in the transmitting antenna to transmit electromagnetic energy into the surrounding environment (including the formation). This transmitted energy generates a corresponding time varying magnetic field in the local environment (e.g., the tool collar, borehole fluid, and the formation). The magnetic field in turn induces electrical currents (eddy currents) in the conductive formation. These eddy currents further produce secondary magnetic fields which may produce a voltage response in a receiving antenna (the electromagnetic energy is received, for example, via measuring the complex voltage in the receiving antenna). The received energy (the received complex voltage including both an attenuation component and a phase change component) may then be processed, for example, using a conventional inversion algorithm to compute the permittivity and the conductivity of the formation.

Example electromagnetic measurement tools include wireline induction tools and logging while drilling propagation tools. The electromagnetic measurements may be made, for example, using the HRLA®, AIT®, ARC®, PERISCOPE®, GeoSphere®, or RTSCANNER® EM logging tools available from Schlumberger Technology Corporation. The disclosed embodiments are, of course, not limited to the use of any particular EM logging tools. As noted above, substantially any suitable measurements (or even estimates) of the permittivity and the conductivity of the graphitic kerogen bearing formation may be utilized.

With continued reference to FIG. 8, upon receiving the various inputs (e.g., as shown on the left hand side of the figure), the effective medium model may be processed to compute the water filled porosity $\phi_w$ and/or the effective aspect ratio of the graphitic kerogen $\xi_0$ particulate in the formation. Although the disclosed embodiments are not limited in this regard, the model (e.g., Equation 14) may be advantageously solved using an inversion algorithm that various the $\sigma_w$ and $\xi_0$ parameters to minimize an error between computed $E_r$ and $\sigma_r$ (e.g., using Equation 14) and the measured $\epsilon_r$ and $\sigma_r$ values (the input values). Such inversion techniques are well known to those of ordinary skill in the art.

FIGS. 9 and 10 depict embodiments in which a joint inversion is processed to compute additional formation parameters. In FIG. 9, the permittivity and conductivity of the formation, the temperature and pressure of the formation, and the additional inputs described above with respect to FIG. 8 are input into the effective medium model as depicted. As also described above, it will be understood that the temperature, pressure, and brine salinity may be input into a water/brine dielectric model to compute the complex dielectric constant of the brine (which may be input into the model).

As further depicted on FIG. 9 an elemental distribution of the formation (e.g., obtained from a nuclear logging measurement as described above may be input into an elements to minerals model $E_{model,j}(M_i, f_g)$ as depicted. The elements to minerals model is intended to relate the elemental distribution of the formation to the volume fraction of minerals $M_i$ and the volume fraction of graphitic kerogen $f_g$ in the formation. Note that j represents the various elements in the elemental distribution and i represents the various minerals in the formation.

With continued reference to FIG. 9, the effective medium model and the elements to minerals model are processed in combination, for example, via a joint inversion to compute the water filled porosity $\phi_w$ and the effective aspect ratio of the graphitic kerogen $\xi_0$ particulate in the formation as well as the volume fraction of graphitic kerogen $f_g$ and the volume fraction of other minerals in the formation $M_i$. The joint inversion may be processed, for example, by minimizing the following cost function:

$$\sum_j \frac{(E_j - E_{model,j}(M_i, f_g))^2}{\sigma_{E_j}^2} + W\left(\frac{(\epsilon - \epsilon_{model}(\phi_w, \xi_0, f_g))^2}{\sigma_\epsilon^2} + \frac{(\sigma - \sigma_{model}(\phi_w, \xi_0, f_g))^2}{\sigma_\sigma^2}\right) \quad (16)$$

where $E_j$ represents the elemental composition of the formation, W is a weighting factor (or function), $E_{model,j}(M_i, f_g)$ represents the relation for the mineral to elements transformation (i.e., the elements to minerals model described above), and $\epsilon_{model}(\phi_w, \xi_0, f_g)$ and $\sigma_{model}(\phi_w, \xi_0, f_g)$ represent the effective medium model predicted permittivity and conductivity given all the modeling and petrophysical parameters described above. The $\sigma_{Ej}$, $\sigma_\epsilon$ and $\sigma_\sigma$ are standard deviations associated with each measurement.

The embodiment depicted on FIG. 10 is similar to that depicted on FIG. 9, with the exception that signals $S_j$ are input into a petrophysical model $S_{model,j}(\phi_w, M_i, f_g)$ that relates the signals to $\phi_w$, $M_i$, and $f_g$ as depicted. These signals $S_j$ may be generated, for example, by other logging measurements that are affected by the mineral volume fractions and saturation of the formation, such as the neutron, density, and/or gamma ray measurements (e.g., as measured in triple combo logs available from Schlumberger Technology Corporation). As described above with respect to FIG. 9, the effective medium model and the petrophysical model are processed in combination, for example, via a joint inversion to compute the water filled porosity $\phi_w$ and the effective aspect ratio of the graphitic kerogen $\xi_0$ particulate in the formation as well as the volume fraction of graphitic kerogen $f_g$ and the volume fraction of other minerals in the formation $M_i$. The joint inversion may be processed, for example, by minimizing the following cost function:

$$\sum_j \frac{W_j(S_j - S_{model,j}(\phi_w, M_i, f_g))^2}{\sigma_{S_j}^2} + \left(\frac{(\epsilon - \epsilon_{model}(\phi_w, \xi_0, f_g))^2}{\sigma_\epsilon^2} + \frac{(\sigma - \sigma_{model}(\phi_w, \xi_0, f_g))^2}{\sigma_\sigma^2}\right) \quad (17)$$

where $S_j$ represent the various signals from the additional logging measurements, $S_{model,j}(\phi_w, M_i, f_g)$ represents the petrophysical model, $W_j$ represent relative weights given to the different signals j, $\sigma_{Sj}^2$ represent the standard deviations of the measured signals, and $E_{model}(\phi_w, \xi_0, f_g)$, $\sigma_{model}(\phi_w, \xi_0, f_g)$, $\sigma_\epsilon$, and $\sigma_\sigma$ are as defined above with respect to Equation 16.

Figure 11:
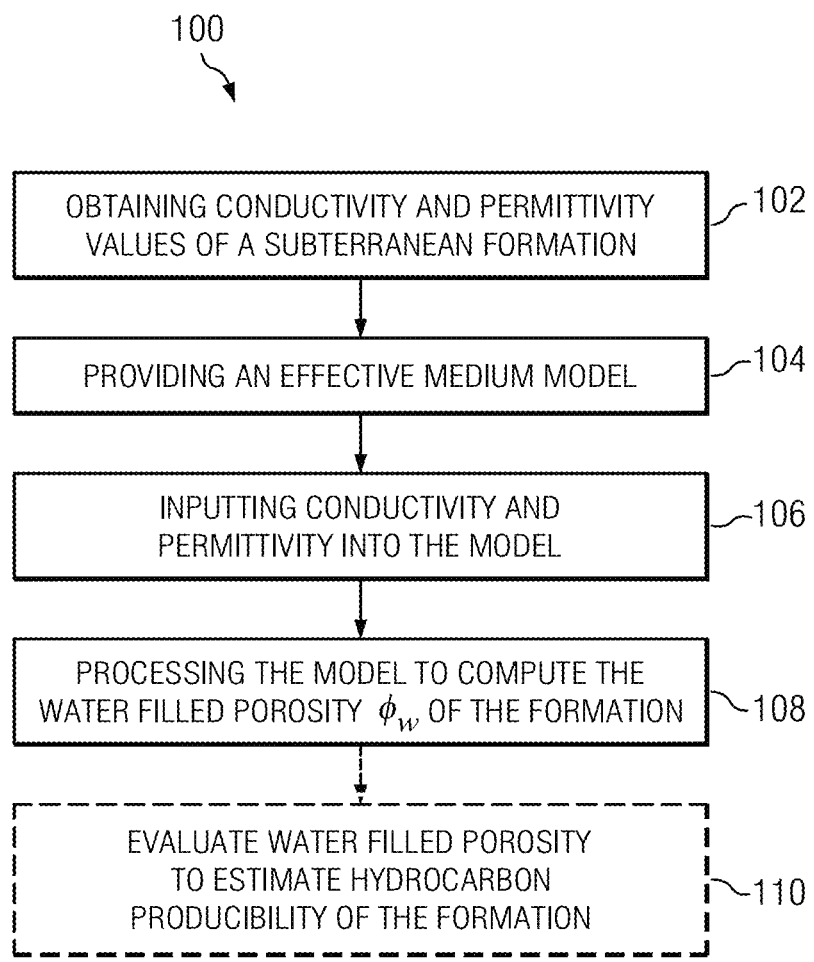
FIG. 11 depicts a flow chart of one disclosed method embodiment.

Turning now to FIG. 11, a flow chart 100 of one example method embodiment for evaluating saturation of a graphitic kerogen bearing formation is depicted. The disclosed method includes obtaining conductivity and permittivity values of the formation (e.g., from electromagnetic logging measurements) at 102. An effective medium model relating the provided conductivity and permittivity values to water filled porosity of the formation and an effective aspect ratio of graphitic kerogen particulate is provided at 104. The obtained conductivity and permittivity values are input into the model at 106. The model is then processed (e.g., via inversion) to compute the water filled porosity of the formation at 108.

With continue reference to FIG. 11, it will be understood that the processing in 108 may enable both the water filled porosity of the formation and the effective aspect ratio of the graphitic kerogen particulate to be computed. Moreover, as also depicted, the water filled porosity may optionally be further evaluated at 110 to estimate a hydrocarbon producibility of the formation. As known to those of ordinary skill in the art hydrocarbon producibility tends to be a function of both the total reserve volume of hydrocarbons in the formation and the flowability of those reserves.

With still further reference to FIG. 11 it will be understood that the conductivity and permittivity values input into the model may be obtained from electromagnetic logging measurements (e.g., wireline induction measurements and/or measurement while drilling propagation measurements). Such measurements may be inverted to compute the conductivity and permittivity values as describe above (and as known to those of ordinary skill in the art). Although not depicted in FIG. 11, the conductivity and permittivity values may be obtained by deploying the electromagnetic measurement tool in a subterranean wellbore penetrating the formation, causing a tool transmitter to transmit electromagnetic energy into the formation, causing at tool receiver to receive the transmitted electromagnetic energy (e.g., as an AC voltage signal), and processing the received electromagnetic energy to compute the conductivity and permittivity values of the formation.

While not depicted on FIG. 11, it will be understood that 106 may further include deploying a nuclear logging tool in the wellbore, causing the nuclear logging tool to make nuclear logging measurements (e.g., spectroscopic gamma ray measurements), processing the nuclear logging measurements to estimate a volume fraction of graphitic kerogen in the formation, and inputting the volume fraction of the graphitic kerogen particulate in the formation into the effective medium model.

It will be understood that the disclosure includes numerous embodiments. These embodiments include, but are not limited to, the following embodiments and combinations thereof.

In a first embodiment a method for evaluating saturation of a graphitic kerogen bearing formation is disclosed. The method includes (a) obtaining conductivity and permittivity values of a graphitic kerogen bearing formation; (b) providing an effective medium model relating the conductivity and the permittivity to a water filled porosity of the formation and an effective aspect ratio of graphitic kerogen particulate in the formation; (c) inputting the conductivity and the permittivity values obtained in (a) into the effective medium model provided in (b); and (d) processing the effective medium model to compute the water filled porosity of the formation.

A second embodiment may include the first embodiment wherein (d) further comprises processing the effective medium model to compute the water filled porosity of the formation and the effective aspect ratio of the graphitic kerogen particulate in the formation.

A third embodiment may include any one of the first and second embodiments wherein (a) further comprises: making an electromagnetic measurement of the formation and processing the electromagnetic measurement to compute the conductivity and the permittivity values.

A fourth embodiment may include any one of the first and second embodiments wherein (a) further comprises: deploying an electromagnetic measurement tool having a transmitter and a receiver in a subterranean wellbore penetrating the formation, causing the transmitter to transmit electromagnetic energy into the formation, causing the receiver to receive said transmitted electromagnetic energy, and processing said received electromagnetic energy to compute the conductivity and the permittivity values.

A fifth embodiment may include any one of the first through fourth embodiments further comprising: (e) evaluating the water filled porosity computed in (d) to estimate a hydrocarbon producibility of the formation.

A sixth embodiment may include any one of the first through fifth embodiments wherein the effective medium model further relates the conductivity and the permittivity of the formation to the water filled porosity of the formation, the volume fraction of the graphitic kerogen particulate in the formation, and first and second polarization coefficients of the graphitic kerogen particulate.

A seventh embodiment may include the sixth embodiment wherein the first and second polarization coefficients are related to at least a complex dielectric constant of the graphitic kerogen particulate, a complex dielectric constant of formation water, and an aspect ratio parameter of the graphitic kerogen particulate, the first polarization coefficient for an electric field applied parallel to a symmetry axis of the graphitic kerogen particulate and the second polarization coefficient for an electric field applied normal to a symmetry axis of the graphitic kerogen particulate.

An eighth embodiment may include any one of the first through seventh embodiments wherein (c) further comprises inputting a volume fraction of the graphitic kerogen particulate in the formation into the effective medium model provided in (b).

A ninth embodiment may include any one of the first through eighth embodiments wherein (c) further comprises: deploying a nuclear logging tool in a subterranean wellbore penetrating the formation, causing the nuclear logging tool to make nuclear logging measurements, processing the nuclear logging measurements to estimate a volume fraction of graphitic kerogen particulate in the formation, and inputting the volume fraction of the graphitic kerogen particulate in the formation into the effective medium model provided in (b).

A tenth embodiment may include any one of the first through ninth embodiments wherein (c) further comprises inputting a temperature and a pressure of the formation into the effective medium model.

An eleventh embodiment may include any one of the first through tenth embodiments wherein (c) further comprises inputting into the effective medium model (i) a mean value and a variance of a lognormal distribution of a grain size of the graphitic kerogen particulate, (ii) a water phase tortuosity exponent of a graphitic kerogen-less background, and (iii) a formation water salinity.

A twelfth embodiment may include any one of the first through eleventh embodiments wherein (c) further comprises: inputting a measured temperature of the formation, a measured pressure of the formation, and a salinity of formation water into a water/brine dielectric model, processing the water/brine dielectric model to compute a complex dielectric constant of the formation water, the complex dielectric constant including a permittivity and a conductivity of the formation water, and inputting the computed permittivity and conductivity of the formation water into the effective medium model.

A thirteenth embodiment may include any one of the first through seventh and tenth through twelfth embodiments wherein: (a) further comprises obtaining elemental concentrations of the formation from a nuclear logging tool; (b) further comprises providing a minerals to elements model relating the elemental concentrations to volume fractions of minerals in the formation; (c) further comprises inputting the elemental concentrations obtained in (a) into the minerals to elements model provided in (b); and (d) comprises processing a joint inversion of the effective medium model and the minerals to elements model to compute (i) the water filled porosity of the formation, (ii) the effective aspect ratio of the graphitic kerogen particulate in the formation, (iii) a volume fraction of graphitic kerogen particulate in the formation, and (iv) volume fractions of other minerals in the formation.

A fourteenth embodiment may include the thirteenth embodiment wherein (c) further comprises inputting into the effective medium model (i) a temperature and a pressure of the formation, (ii) a mean value and a variance of a lognormal distribution of a grain size of the graphitic kerogen particulate, (iii) a water phase tortuosity exponent of a graphitic kerogen-less background, and (iv) a formation water salinity.

A fifteenth embodiment may include any one of the first through seventh and tenth through twelfth embodiments wherein: (a) further comprises obtaining other logging measurements of the formation; (b) further comprises providing a petrophysical model relating the other logging measurements to petrophysical parameters of the formation, the petrophysical parameters including a water filled porosity of the formation and volume fractions of minerals in the formation; (c) further comprises inputting the logging measurements obtained in (a) into the logging measurement model provided in (b); and (d) comprises processing a joint inversion of the effective medium model and the petrophysical model to compute (i) the water filled porosity of the formation, (ii) the effective aspect ratio of the graphitic kerogen particulate in the formation, (iii) a volume fraction of graphitic kerogen particulate in the formation, and (iv) volume fractions of other minerals in the formation.

A sixteenth embodiment may include the fifteenth embodiment wherein (c) further comprises inputting into the effective medium model (i) a temperature and a pressure of the subterranean formation, (ii) a mean value and a variance of a lognormal distribution of a grain size of the graphitic kerogen particulate, (iii) a water phase tortuosity exponent of a graphitic kerogen-less background, and (iv) a formation water salinity.

In a seventeenth embodiment a method for evaluating saturation of a graphitic kerogen bearing formation is disclosed. The method includes: (a) providing an effective medium model relating a conductivity and a permittivity of a formation to a water filled porosity of the formation, an effective aspect ratio of graphitic kerogen particulate in the formation, and first and second polarization coefficients of the graphitic kerogen particulate in formation brine; (b) making an electromagnetic logging measurement of the formation; (c) processing the electromagnetic measurement to compute the conductivity and permittivity of the formation; (d) making a spectroscopic gamma ray logging measurement of the formation; (e) processing the spectroscopic gamma ray logging measurement to estimate a volume fraction of the graphitic kerogen particulate in the formation; (f) making temperature and pressure measurements of the formation; (g) processing the temperature and pressure measurements in combination with a salinity of the formation brine to compute a conductivity and a permittivity of the formation brine; (h) inputting into the effective medium model: (i) the conductivity and the permittivity of the formation computed in (c), (ii) the volume fraction of the graphitic kerogen particulate estimated in (e), and (iii) the conductivity and the permittivity of the formation brine computed in (g); and (i) processing the effective medium model to compute the water filled porosity of the formation and the effective aspect ratio of graphitic kerogen particulate in the formation.

Although a method for saturation evaluation of graphitic kerogen bearing formations has been described in detail, it should be understood that various changes, substitutions and alternations can be made herein without departing from the spirit and scope of the disclosure as defined by the appended claims. Numbers, percentages, ratios, or other values stated herein are intended to include that value, and also other values that are "about" or "approximately" the stated value, as would be appreciated by one of ordinary skill in the art encompassed by embodiments of the present disclosure. A stated value or terms such as "about," "approximately," "generally," and the like, should therefore be interpreted broadly enough to encompass values, orientations, or features that are at least close enough to the stated value, orientation, or feature to perform a desired function or achieve a desired result.

It should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein. Accordingly, all such modifications are intended to be included within the scope of this disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function.

What is claimed is:

1. A method for evaluating saturation of a subterranean formation, the method comprising:
    (a) obtaining conductivity and permittivity values of the subterranean formation via one or more measurement tools;
    (b) providing an effective medium model relating the conductivity and permittivity values to a water filled porosity of the subterranean formation and an effective aspect ratio of graphitic kerogen particulate in the subterranean formation;
    (c) inputting the conductivity and the permittivity values obtained in (a) into the effective medium model provided in (b);
    (d) processing the effective medium model to compute the water filled porosity of the subterranean formation; and
    (e) determining a hydrocarbon producibility of the subterranean formation based on the water filled porosity.

2. A method for evaluating saturation of a subterranean formation, the method comprising:
    (a) providing an effective medium model relating a conductivity and a permittivity of the subterranean formation to a water filled porosity of the subterranean formation, an effective aspect ratio of graphitic kerogen particulate in the subterranean formation, and first and second polarization coefficients of the graphitic kerogen particulate in formation brine;
    (b) obtaining, via one or more measurement tools, an electromagnetic logging measurement of the subterranean formation;
    (c) processing the electromagnetic logging measurement to compute the conductivity and permittivity of the subterranean formation;
    (d) obtaining, via the one or more measuring tools, a spectroscopic gamma ray logging measurement of the subterranean formation;
    (e) processing the spectroscopic gamma ray logging measurement to estimate a volume fraction of the graphitic kerogen particulate in the subterranean formation;
    (f) obtaining, via the one or more measurement tools, temperature and pressure measurements of the subterranean formation;
    (g) processing the temperature and pressure measurements in combination with a salinity of the formation brine to compute an additional conductivity and an additional permittivity of the formation brine;
    (h) inputting into the effective medium model: (i) the conductivity and the permittivity of the subterranean formation computed in (c), (ii) the volume fraction of the graphitic kerogen particulate estimated in (e), and (iii) the additional conductivity and the additional permittivity of the formation brine computed in (g);
    (i) processing the effective medium model to compute the water filled porosity of the subterranean formation and the effective aspect ratio of the graphitic kerogen particulate in the subterranean formation; and
    (j) determining a hydrocarbon producibility of the subterranean formation based on the water filled porosity.

3. The method of claim 1, wherein (d) further comprises processing the effective medium model to compute the water filled porosity of the subterranean formation and the effective aspect ratio of the graphitic kerogen particulate in the subterranean formation.

4. The method of claim 1, wherein (a) further comprises:
    (a1) making an electromagnetic measurement of the subterranean formation via the one or more measurement tools; and
    (a2) processing the electromagnetic measurement to compute the conductivity and the permittivity values.

5. The method of claim 1, wherein the one or more measurement tools comprise an electromagnet measurement tool, and (a) further comprises:
    (a1) deploying the electromagnetic measurement tool having a transmitter and a receiver in a subterranean wellbore penetrating the subterranean formation;
    (a2) causing the transmitter to transmit electromagnetic energy into the subterranean formation;
    (a3) causing the receiver to receive said transmitted electromagnetic energy; and
    (a4) processing said received electromagnetic energy to compute the conductivity and the permittivity values.

6. The method of claim 1, wherein the effective medium model further relates the conductivity and permittivity values of the subterranean formation to:
    the water filled porosity of the subterranean formation;

a volume fraction of the graphitic kerogen particulate in the subterranean formation; and first and second polarization coefficients of the graphitic kerogen particulate.

7. The method of claim 6 wherein the first and second polarization coefficients are related to at least a complex dielectric constant of the graphitic kerogen particulate, a complex dielectric constant of formation water, and an aspect ratio parameter of the graphitic kerogen particulate, wherein the first polarization coefficient corresponds to an electric field applied parallel to a symmetry axis of the graphitic kerogen particulate, and the second polarization coefficient corresponds to an electric field applied normal to the symmetry axis of the graphitic kerogen particulate.

8. The method of claim 1, wherein (c) further comprises inputting a volume fraction of the graphitic kerogen particulate in the subterranean formation into the effective medium model provided in (b).

9. The method of claim 1, wherein (c) further comprises:
(c1) deploying a nuclear logging tool in a subterranean wellbore penetrating the subterranean formation;
(c2) causing the nuclear logging tool to make nuclear logging measurements;
(c3) processing the nuclear logging measurements to estimate a volume fraction of the graphitic kerogen particulate in the subterranean formation; and
(c4) inputting the volume fraction of the graphitic kerogen particulate in the subterranean formation into the effective medium model provided in (b).

10. The method of claim 1, wherein (c) further comprises inputting a temperature and a pressure of the subterranean formation into the effective medium model.

11. The method claim 1, wherein (c) further comprises inputting into the effective medium model (i) a mean value and a variance of a lognormal distribution of a grain size of the graphitic kerogen particulate, (ii) a water phase tortuosity exponent of a graphitic kerogen-less background, and (iii) a formation water salinity.

12. The method of claim 1, wherein (c) further comprises:
inputting a measured temperature of the subterranean formation, a measured pressure of the subterranean formation, and a salinity of formation water into a water/brine dielectric model;
processing the water/brine dielectric model to compute a complex dielectric constant of the formation water based on an additional permittivity and an additional conductivity of the formation water; and
inputting the additional permittivity and the additional conductivity of the formation water into the effective medium model.

13. The method of claim 1, wherein:
(a) further comprises obtaining elemental concentrations of the subterranean formation from a nuclear logging tool;
(b) further comprises providing a minerals to elements model relating the elemental concentrations to volume fractions of minerals in the subterranean formation;
(c) further comprises inputting the elemental concentrations obtained in (a) into the minerals to elements model provided in (b); and
(d) comprises processing a joint inversion of the effective medium model and the minerals to elements model to compute (i) the water filled porosity of the subterranean formation, (ii) the effective aspect ratio of the graphitic kerogen particulate in the subterranean formation, (iii) a volume fraction of the graphitic kerogen particulate in the subterranean formation, and (iv) additional volume fractions of other minerals in the subterranean formation.

14. The method of claim 13, wherein (c) further comprises inputting into the effective medium model (i) a temperature and a pressure of the subterranean formation, (ii) a mean value and a variance of a lognormal distribution of a grain size of the graphitic kerogen particulate, (iii) a water phase tortuosity exponent of a graphitic kerogen-less background, and (iv) a formation water salinity.

15. The method of claim 1, wherein:
(a) further comprises obtaining other logging measurements of the subterranean formation;
(b) further comprises providing a petrophysical model relating the other logging measurements to petrophysical parameters of the subterranean formation, the petrophysical parameters including the water filled porosity of the subterranean formation and volume fractions of minerals in the subterranean formation;
(c) further comprises inputting the other logging measurements obtained in (a) into the petrophysical model provided in (b); and
(d) comprises processing a joint inversion of the effective medium model and the petrophysical model to compute (i) the water filled porosity of the subterranean formation, (ii) the effective aspect ratio of the graphitic kerogen particulate in the subterranean formation, (iii) a volume fraction of the graphitic kerogen particulate in the subterranean formation, and (iv) additional volume fractions of other minerals in the subterranean formation.

16. The method of claim 15, wherein (c) further comprises inputting into the effective medium model (i) a temperature and a pressure of the subterranean formation, (ii) a mean value and a variance of a lognormal distribution of a grain size of the graphitic kerogen particulate, (iii) a water phase tortuosity exponent of a graphitic kerogen-less background, and (iv) a formation water salinity.

17. The method of claim 1, comprising deploying an electromagnetic measurement tool into a subterranean wellbore penetrating the subterranean formation.

18. The method of claim 17, wherein the electromagnetic measurement tool includes a transmitter and a receiver electromagnetically coupled to one another, and the method comprises:
applying, via the electromagnet measurement tool, an alternating current in the transmitter to transmit electromagnetic energy into the subterranean formation;
receiving, via the receiver, a voltage in response to the electromagnetic energy; and
computing the conductivity and permittivity values based on the voltage.

19. The method of claim 1, comprising performing a drilling operation in the subterranean formation.

20. The method of claim 19, wherein obtaining the conductivity and permittivity values comprises obtaining the conductivity and permittivity values from measurements during the drilling operation.

* * * * *